United States Patent
Akiyoshi

(10) Patent No.: US 9,525,613 B2
(45) Date of Patent: Dec. 20, 2016

(54) COMMUNICATION SYSTEM, LOGICAL CHANNEL CONTROL DEVICE, CONTROL DEVICE, COMMUNICATION METHOD AND PROGRAM

(75) Inventor: Ippei Akiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 571 days.

(21) Appl. No.: 13/350,611

(22) Filed: Jan. 13, 2012

(65) Prior Publication Data
US 2012/0113989 A1    May 10, 2012

Related U.S. Application Data

(63) Continuation of application No. PCT/JP2011/063026, filed on Jun. 7, 2011.

(30) Foreign Application Priority Data

Jun. 9, 2010 (JP) ................................ 2010-132181

(51) Int. Cl.
| | |
|---|---|
| *H04L 12/28* | (2006.01) |
| *H04L 12/751* | (2013.01) |
| *H04L 12/46* | (2006.01) |
| *H04L 12/721* | (2013.01) |

(52) U.S. Cl.
CPC ............ *H04L 45/02* (2013.01); *H04L 12/462* (2013.01); *H04L 12/4633* (2013.01); *H04L 12/4641* (2013.01); *H04L 45/38* (2013.01)

(58) Field of Classification Search
CPC ....................................................... H04L 12/56
USPC .. 370/230–236, 389–392, 401–463; 709/227
See application file for complete search history.

(56) References Cited

U.S. PATENT DOCUMENTS

| | | | |
|---|---|---|---|
| 6,717,944 B1* | 4/2004 | Bryden et al. ................ 370/392 |
| 7,373,660 B1* | 5/2008 | Guichard ............... H04L 47/10 |
| | | | 726/15 |
| 2003/0187926 A1* | 10/2003 | Karjanlahti .......... H04L 12/189 |
| | | | 709/204 |
| 2008/0049621 A1 | 2/2008 | McGuire et al. |

OTHER PUBLICATIONS

3GPP TS 23.401 ver.9.3.0. "General Packet Radio Service (GPRS) enhancements for Evolved Universal Terrestrial Radio Access Network (E-UTRAN) access", [search conducted Mar. 8, 2010] Internet URL: <http://www.3gpp.org/ftp/Specs/archive/23_series/23.401/23401-930.zip>.

(Continued)

*Primary Examiner* — Iqbal Zaidi
(74) *Attorney, Agent, or Firm* — McGinn IP Law Group, PLLC

(57) ABSTRACT

A configuration having a control device that sets a processing rule in a forwarding node, the configuration being capable of forwarding control of duplicated packets in private IP address spaces. At least one forwarding node among forwarding nodes operates as a logical channel control device that establishes a logical channel to an external node, generate or delete a virtual port information associated with said logical channel established to said external node, and gives notification thereof to the control device, and the control device computes a forwarding path of a packet using the notified port information.

16 Claims, 32 Drawing Sheets

(56) References Cited

OTHER PUBLICATIONS

"OpenFlow Switch Specification" Version 1.0.0. (Wire Protocol 0×01), [search conducted Mar. 8, 2010] Internet URL: <http://www.openflowswitch.org/documents/openflow-spec-v1.0.0.pdf>.
OpenFlow Switch Specification, [online], Dec. 31, 2009 (Dec. 31, 2009), [retrieval date Jun. 27, 2011 (Jun. 27, 2011], Internet <URL:http://www.openflow.org/documents/openflow-spec-v1.0.0.pdf>.
Hiroshi Kubota, "New Face Researcg & Development", Nikkei Network, No. 104, Nov. 28, 2008 (Nov. 28, 2008), pp. 80-81.
Motoo Nishihara, et al., "Cloud Shiko Service Platform o Sasaeru Kiban Gijutsu/IT Infrastructure", NEC Technical Journal, vol. 63, No. 2, Apr. 23, 2010 (Apr. 23, 2010), pp. 89-93.
International Search Report (ISR) (PCT Form PCT/ISA/210) for PCT/JP2011/063026, dated Jul. 5, 2011, previously filed on Jan. 13, 2012.
European Search Report dated Oct. 23, 2014.
Wonho Kim, et al.: "Automated and Scalable QoS Control for Network Convergence", USENIX, Apr. 7, 2010, pp. 1-6.
Rob Sherwood, et al.: "FlowVisor: A Network Virtualization Layer", Oct. 14, 2009.

\* cited by examiner

FIG. 3

| TERMINAL IDENTIFICATION INFORMATION | LOCATION INFORMATION | | NETWORK ATTRIBUTE | FLOW INFORMATION |
|---|---|---|---|---|
| | SWITCH NUMBER | PORT NUMBER | | |
| IP ADDRESS (COMMUNICATION TERMINAL 51) | VIRTUAL FLOW SWITCH UNIT 42 | #1 | PDN11 | SOURCE IP = IP (COMMUNICATION TERMINAL 51) |
| IP ADDRESS (COMMUNICATION TERMINAL 51) | VIRTUAL FLOW SWITCH UNIT 42 | #2 | PDN11 | DESTINATION IP = IP (COMMUNICATION TERMINAL 51) |
| IP ADDRESS (COMMUNICATION TERMINAL 52) | VIRTUAL FLOW SWITCH UNIT 42 | #3 | PDN12 | SOURCE IP = IP (COMMUNICATION TERMINAL 52) |
| IP ADDRESS (COMMUNICATION TERMINAL 52) | VIRTUAL FLOW SWITCH UNIT 42 | #4 | PDN12 | DESTINATION IP = IP (COMMUNICATION TERMINAL 52) |
| Any | FORWARDING NODE 31 | #1 | PDN11 | Any |
| Any | FORWARDING NODE 32 | #1 | PDN12 | Any |

FIG. 4

| SWITCH NUMBER | PORT NUMBER | NETWORK ATTRIBUTE |
|---|---|---|
| FORWARDING NODE 30 | 1 | Global |
| | 2 | Global |
| | : | : |
| | N0 | Global |
| FORWARDING NODE 31 | 1 | PDN1 1 |
| | 2 | Global |
| | : | : |
| | N1 | Global |
| FORWARDING NODE 32 | 1 | PDN1 2 |
| | 2 | Global |
| | : | : |
| | N2 | Global |
| VIRTUAL FLOW SWITCH UNIT 42 | 1 | PDN1 1 |
| | 2 | PDN1 1 |
| | 3 | PDN1 2 |
| | 4 | PDN1 2 |

FIG. 6

| LOGICAL CHANNEL NUMBER | NETWORK ATTRIBUTE | FLOW INFORMATION | INTERNAL IF NUMBER |
|---|---|---|---|
| 1 | PDN11 | SOURCE IP = IP (COMMUNICATION TERMINAL 51) | 1 |
| 2 | PDN11 | DESTINATION IP = IP (COMMUNICATION TERMINAL 51) | 2 |
| 3 | PDN12 | SOURCE IP = IP (COMMUNICATION TERMINAL 52) | 3 |
| 4 | PDN13 | DESTINATION IP = IP (COMMUNICATION TERMINAL 52) | 4 |

FIG. 11

| TERMINAL IDENTIFICATION INFORMATION | LOCATION INFORMATION | | NETWORK ATTRIBUTE | FLOW INFORMATION |
|---|---|---|---|---|
| | SWITCH NUMBER | PORT NUMBER | | |
| IP ADDRESS (COMMUNICATION TERMINAL 51) | VIRTUAL FLOW SWITCH UNIT 42 | #1 | PDN1 1 | Any |
| IP ADDRESS (COMMUNICATION TERMINAL 52) | VIRTUAL FLOW SWITCH UNIT 42 | #2 | PDN1 2 | Any |
| Any | FORWARDING NODE 31 | #1 | PDN1 1 | Any |
| Any | FORWARDING NODE 32 | #1 | PDN1 2 | Any |

FIG. 12

| SWITCH NUMBER | PORT NUMBER | NETWORK ATTRIBUTE |
|---|---|---|
| FORWARDING NODE 30 | 1 | Global |
| | 2 | Global |
| | : | : |
| | N0 | Global |
| FORWARDING NODE 31 | 1 | PDN11 |
| | 2 | Global |
| | : | : |
| | N1 | Global |
| FORWARDING NODE 32 | 1 | PDN12 |
| | 2 | Global |
| | : | : |
| | N2 | Global |
| VIRTUAL FLOW SWITCH UNIT 42 | 1 | PDN11 |
| | 2 | PDN12 |

FIG. 14

| LOGICAL CHANNEL NUMBER | NETWORK ATTRIBUTE | FLOW INFORMATION | INTERNAL IF NUMBER |
|---|---|---|---|
| 1 | PDN11 | SOURCE IP = IP (COMMUNICATION TERMINAL 51) | 1 |
| 2 | PDN11 | DESTINATION IP = IP (COMMUNICATION TERMINAL 51) | 1 |
| 3 | PDN12 | SOURCE IP = IP (COMMUNICATION TERMINAL 52) | 2 |
| 4 | PDN13 | DESTINATION IP = IP (COMMUNICATION TERMINAL 52) | 2 |

COMMUNICATION SYSTEM, LOGICAL CHANNEL CONTROL DEVICE, CONTROL DEVICE, COMMUNICATION METHOD AND PROGRAM

REFERENCE TO RELATED APPLICATION

This application is a continuation of International Application No. PCT/JP2011/063026, filed on Jun. 7, 2011, and claims priority to Japanese Patent Application No. 2010-132181, filed on Jun. 9, 2010, both of which are incorporated herein by reference in their entireties.

TECHNICAL FIELD

The present invention relates to a communication system, a logical channel control device, a control device, a communication method and a computer-readable storage medium storing a program, and relates to a communication system, a logical channel control device, a control device, a communication method and a computer-readable storage medium storing a program, which realize communication by forwarding packets by forwarding nodes arranged in a network.

BACKGROUND

A mobile network represented by a mobile operator network, as shown in FIG. 30, is configured by an E-UTRAN Node-B (eNodeB) X40, a Mobility Management Entity (MME) X41, a Serving Gateway (Serving GW) X42, and a Packet Data Network Gateway (PDN GW) X43 (refer to Non-Patent Document 1) An outline thereof is described below.

The eNodeB X40 is a logical channel control device that provides a logical channel to a communication terminal through wireless access, referred to as Long Term Evolution (LTE).

The MME X41 is a control device that controls a plurality of eNodeBs and Serving GWs, and is provided with a function to control a logical channel referred to as an Evolved Packet System (EPS) bearer in order to support handover between eNBs and packet communication for a communication terminal.

The Serving GW X42 is a packet forwarding device belonging to a geographical area inside which a communication terminal is present, and is provided with a function to relay a data packet forwarded between an eNodeB and the PDN GW.

The PDN GW X43 is a gateway device for providing access to a Packet Data Network (PDN) 11, and is provided with a function of generating an EPS bearer for a communication terminal via the Serving GW X42, and also of giving out an IP address in order to access the PDN 11 to the communication terminal. The PDN may be, for example, an operator network (a telecommunications carrier network) or intranet, a university campus network, a home network, or the like.

In the mobile network of FIG. 30 described above, the communication terminal X51 is connected to the eNodeB X40, and a description is given using FIG. 31, concerning a series of steps up to accessing a server X61 that is inside the PDN 11.

On linking up with the eNodeB X40, the communication terminal X51 generates the EPS bearer in order to access the PDN 11. At this time, the MME X41 and the Serving GW X42 use information referred to as Access Point Name (APN) to identify the PDN 11 that the communication terminal X51 is trying to access. This APN may be obtained by a method in which the communication terminal X51 gives notification to a communication system, or a method of downloading from a subscriber information database referred to as a Home Subscriber Server (HSS), which is omitted in FIG. 30. The PDN GW X43 gives out an IP address for accessing the PDN 11, to the communication terminal X51 at this time. As described above, when the EPS bearer is established between the communication terminal X51 and the PDN 11, a series of tunnels is generated between the communication terminal X51 and the PDN 11. The communication terminal X51 can access the server X61 present inside the PDN 11 via tunnels established in this way.

In this way, with technology of Non-Patent Document 1, in order for the communication terminal to realize access by generation of the tunnels as far as the PDN, the PDN and the communication terminal use a private IP address, and even if there is an address conflict of another PDN or communication terminal and an address space, it is possible to identify communications of each thereof, and to provide respective PDN access.

Non-Patent Document 2 is a specification of technology known as OpenFlow. In OpenFlow, communication is taken as end-to-end flow, and path control, recovery from failure, load balancing, and optimization are performed in flow units. An OpenFlow switch functioning as a forwarding node is provided with a secure channel for communication with an OpenFlow controller and operates according to a flow table in which appropriate addition or rewriting is instructed by an OpenFlow controller. In the flow table, sets (processing rules) of rules (FlowKey, matching key) for collation with packet headers, actions (Action) defining processing content, and flow statistical information (Stats), are defined for each flow (refer to FIG. 32).

For example, when an OpenFlow switch receives a first packet, an entry is searched for, that has a rule (FlowKey) matching header information of the received packet, from the flow table. As a result of the search, in a case where an entry matching the received packet is found, the OpenFlow switch implements processing content described in an action field of the entry, for the received packet. On the other hand, as a result of the search, in a case where an entry matching the received packet is not found, the OpenFlow switch forwards the received packet to the OpenFlow controller via a secure to request determination of a path of the packet based on source and destination of the received packet, receives a processing rule (flow entry) for realizing this, and updates the flow table. According to the above description, forwarding of the packet belonging to the flow is realized.

[Non-Patent Document 1]
3GPP TS 23.401 ver. 9.3.0. "General Packet Radio Service (GPRS) enhancements for Evolved Universal Terrestrial Radio Access Network (E-UTRAN) access", [search conducted Mar. 8, 2010] Internet URL: <http://www.3gpp.org/ftp/Specs/archive/23_series/23.401/23401-930.zip>

[Non-Patent Document 2]
"OpenFlow Switch Specification" Version 1.0.0. (Wire Protocol 0x01), [search conducted Mar. 8, 2010] Internet URL: <http://www.openflowswitch.org/documents/openflow-spec-v1.0.0.pdf>

SUMMARY

Each of the disclosures of the abovementioned Non-Patent Documents is incorporated herein by reference thereto.

The following analysis is given by the present inventors. Due to the rapid increase in mobile internet traffic in recent years, however, consideration is being given by the 3GPP to a method of transmitting and receiving data packets directly via the Internet, without going through a communication system owned by a mobile operator, from an eNodeB, with the name of Selected IP Traffic Offload (SIPTO). It is envisioned that a communication system to which this SIPTO is applied is to be realized by providing functions of a Serving GW and a PDN GW to the eNodeB.

FIG. 15 is a diagram showing a configuration of a communication system to which the technology of Non-Patent Document 2 is applied. In the example of FIG. 15, the communication system 3 is configured by a control device 120 corresponding to an OpenFlow controller described above, flow switches 130 to 132 corresponding to OpenFlow switches described above, an eNodeB 140, and an MME 241.

The control device 120, as described in detail later using FIG. 2, is provided with a topology management unit that manages network topology based on information collected from the flow switches, a path/action computation unit that computes a forwarding path of a received packet and an action for realizing the forwarding path by referring to the network topology, and a flow entry management unit that generates a flow entry which has a timeout value attached, and is also provided with a communication terminal location management unit that manages which port in which flow switch a communication terminal is connected to, and a flow switch management unit that manages configuration information and the like of a flow switch; wherein processing rules (flow entries) are set in the flow switches 130 to 132.

The flow switches 130 to 132 perform processing of the received packets based on the processing rules (flow entries) set by the control device 120. Specifically, on receiving a packet, the flow switches 130 to 132 search for a processing rule (flow entry) having a matching key that matches the received packet, from a flow table in which the processing rules (flow entries) are stored, and implement processing prescribed in an action field of a retrieved processing rule (flow entry) (for example, forwarding to a specific port, flooding, header rewriting, dropping, and the like).

Furthermore, the flow switches 130 to 132 reset a timeout value within the action field of the retrieved processing rule (flow entry) each time a packet is processed. On the other hand, when a packet matching a certain processing rule (flow entry) is not received and a determination of a timeout is made, a flow switch deletes the processing rule (flow entry).

The eNodeB 140 of FIG. 15 is a logical channel control device that provides a logical channel to a communication terminal via wireless access referred to as Long Term Evolution (LTE), and is provided with functions of a Serving GW X42 and a PDN GW X43, described in FIG. 30.

In the communication system 3 that has this type of configuration, access to a PDN belonging to a plurality of competing private address spaces is operated as follows.

First, it is assumed that a PDN 11 and a PDN 12 are private IP networks, and subnets thereof are the same. Furthermore, the same IP address is assigned to a server 161 and a server 162 that are present in the respective PDNs.

On linking up with the eNodeB 140, the communication terminal 151 generates an EPS bearer in order to have an IP address assigned from an IP address pool managing the eNodeB 140. At this time, the communication system 151 gives notification to this effect, to the eNodeB 140 using an APN.

When confirmation of generation of the abovementioned EPS bearer is given by the MME 241, the eNodeB 140 establishes the EPS bearer between the communication terminal 151 and the eNodeB 140. In the present communication system 3, since the eNodeB 140 is provided with functions of the Serving GW and the PDN GW, the EPS bearer is terminated by the eNodeB 140.

Next, the communication terminal 151 transmits a data packet in order to access the server 61. The data packet reaches the flow switch 130 via the eNodeB 140. On receiving the data packet, the flow switch 130 searches the flow table and retrieves a processing rule (flow entry) matching the received packet. However, since this packet is an unknown packet, a relevant processing rule (flow entry) does not exist. Therefore, after buffering the received packet, the flow switch 130 transmits a new flow detection notification (Packet-In) to the control device 120. The new flow detection notification includes a packet receiving port identifier and information (for example, a MAC address, an IP address, a port number, (including source and destination of each thereof)) that is required for identifying a processing rule (flow entry).

On receiving the new flow detection notification, in order to compute a packet forwarding path from the communication terminal 151 to the server 161, the control device 120 performs location confirmation of the server 161 that is the destination, but since the IP address of the server 161, which is information for identifying the location, is a private IP address, it is not possible to identify the location with only the information obtained from the new flow detection notification.

In essence, there is a problem in a communication system where the technology of Non-Patent Document 2 is applied to SIPTO described above, or the like, in that it is not possible to forward duplicated packets in private IP address spaces to an appropriate destination. A reason for this is that the control device cannot recognize a private IP address space that the communication terminal is attempting to access.

Accordingly, it is an object of the present invention to provide a configuration that can realize forwarding control of duplicated packets in private IP address spaces, in a configuration having a control device that sets a processing rule in a forwarding node.

According to a first aspect of the present invention, there is provided a communication system including: a control device that sets a processing rule in a forwarding node: and a plurality of forwarding nodes provided with a packet processing unit that performs processing of a received packet based on the set processing rule; wherein at least one forwarding node among the forwarding nodes operates as a logical channel control device that establishes a logical channel to an external node, generates or deletes a virtual port information associated with said logical channel established to said external node, and gives notification thereof to the control device, and the control device uses the notified port information to compute a forwarding path of a packet.

According to a second aspect of the present invention, there is provided a logical channel control device including: a logical channel management unit that establishes a logical channel to an external node and also generates or deletes a virtual port associated with said logical channel established to said external node; and a virtual flow switch unit that performs processing of a received packet based on a processing rule set by a control device and also gives notification of creation or deletion of the virtual port to the control device.

According to a third aspect of the present invention, there is provided a control device that computes a forwarding path of a packet, based on network attribute information associated with port information, and sets a processing rule in a forwarding node in the forwarding path of the packet.

According to a fourth aspect of the present invention, there is provided a communication method including: a step in which at least one forwarding node among a plurality of forwarding nodes, which are connected to a control device that sets a processing rule in a forwarding node and are provided with a packet processing unit that performs processing of a received packet based on the set processing rule, operates as a logical channel control device that establishes a logical channel to an external node, gives virtual port information to the logical channel established to the external node, and gives notification thereof to the control device; and a step in which the control device computes a forwarding path of the packet using the notified port information and also creates a processing rule to realize the forwarding path, and sets the processing rule in the forwarding node. It is to be noted that the present method is linked with a specific apparatus known as a computer that respectively forms the logical channel control device and the control device described above.

According to a fifth aspect of the present invention, there is provided a computer program that causes a computer, which configures a forwarding node that performs processing of a received packet based on a processing rule set by a control device, to execute: a process of establishing a logical channel to a communication terminal and also of generating or deleting a virtual port associated with said logical channel established to said external node; and a process of giving a notification of creation or deletion of the port to a control device. It is to be noted that the program can be recorded in a computer-readable storage medium. That is, the present invention can be embodied by a computer program product. Also the program may be regarded as either a program product (i.e. manufacture) or a process embodying the communication method (process), expressed in a program language.

The meritorious effects of the present invention are summarized as follows.

According to the present invention it is possible to identify respective duplicated packets in private IP address spaces as separate flows and to forward the packets. A reason for this is that a forwarding node operating as the logical channel control device establishes a logical channel to an external node and makes an association with the logical channel to generate or delete virtual port information, and gives notification thereof to the control device, and the control device performs computation of a packet forwarding path based on port information notified by the forwarding node that operates as the logical channel control device.

BRIEF DESCRIPTION OF THE DRAWINGS

FIG. 3 is an example of a table held in a communication terminal location management unit of the control device of the first exemplary embodiment of the present invention;

FIG. 4 is an example of a table held in a port attribute management unit of the control device of the first exemplary embodiment of the present invention;

FIG. 6 is an example of a table held in a logical channel management unit of the logical channel control device of the first exemplary embodiment of the present invention;

FIG. 11 is an example of a table held in a communication terminal location management unit of a control device of a second exemplary embodiment of the present invention;

FIG. 12 is an example of a table held in a port attribute management unit of the control device of the second exemplary embodiment of the present invention;

FIG. 14 is an example of a table held in a logical channel management unit of the logical channel control device of the second exemplary embodiment of the present invention;

PREFERRED MODES

Figure 1:
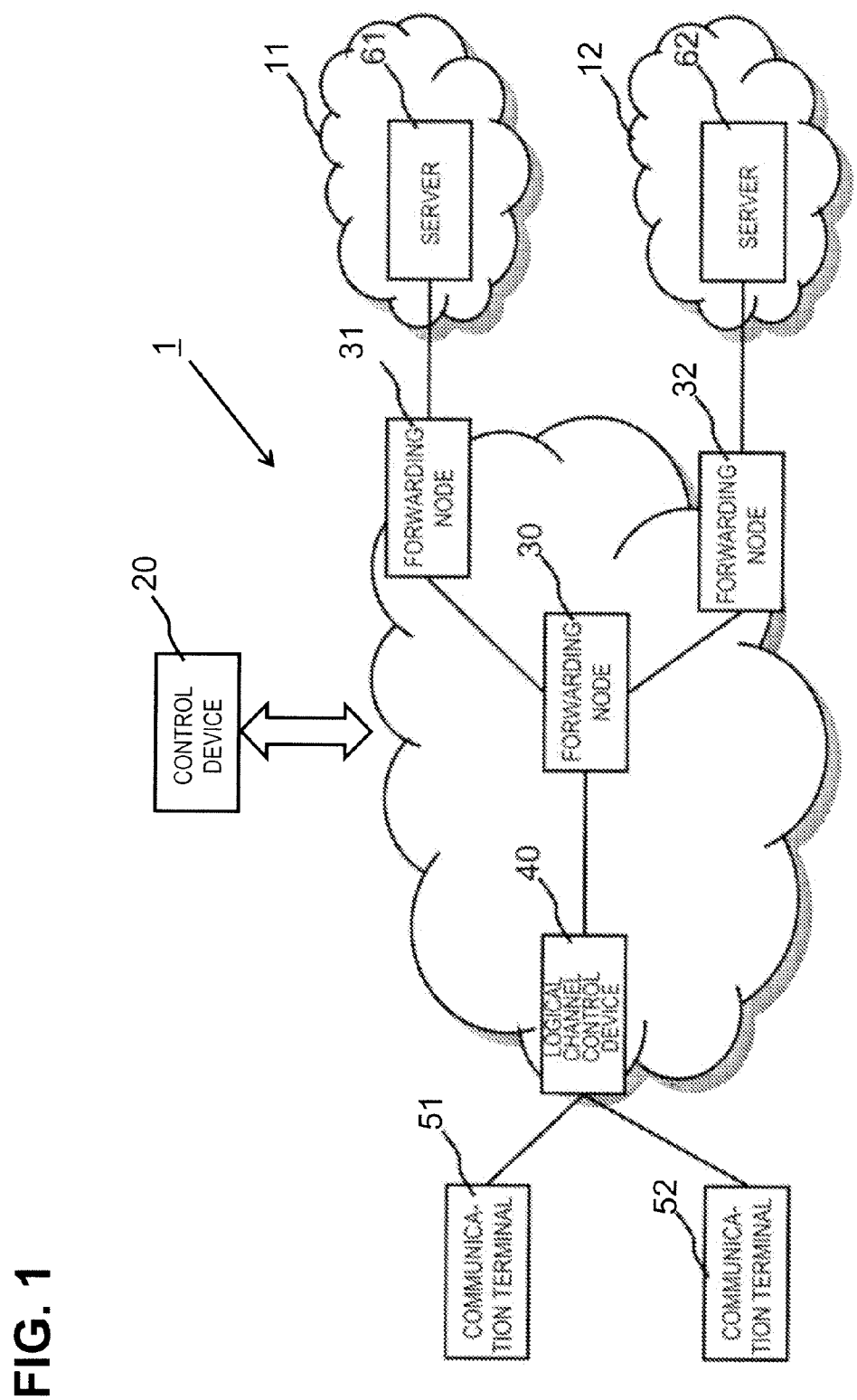
FIG. 1 is a diagram for describing a configuration of the first exemplary embodiment of the present invention.
Figure 2:
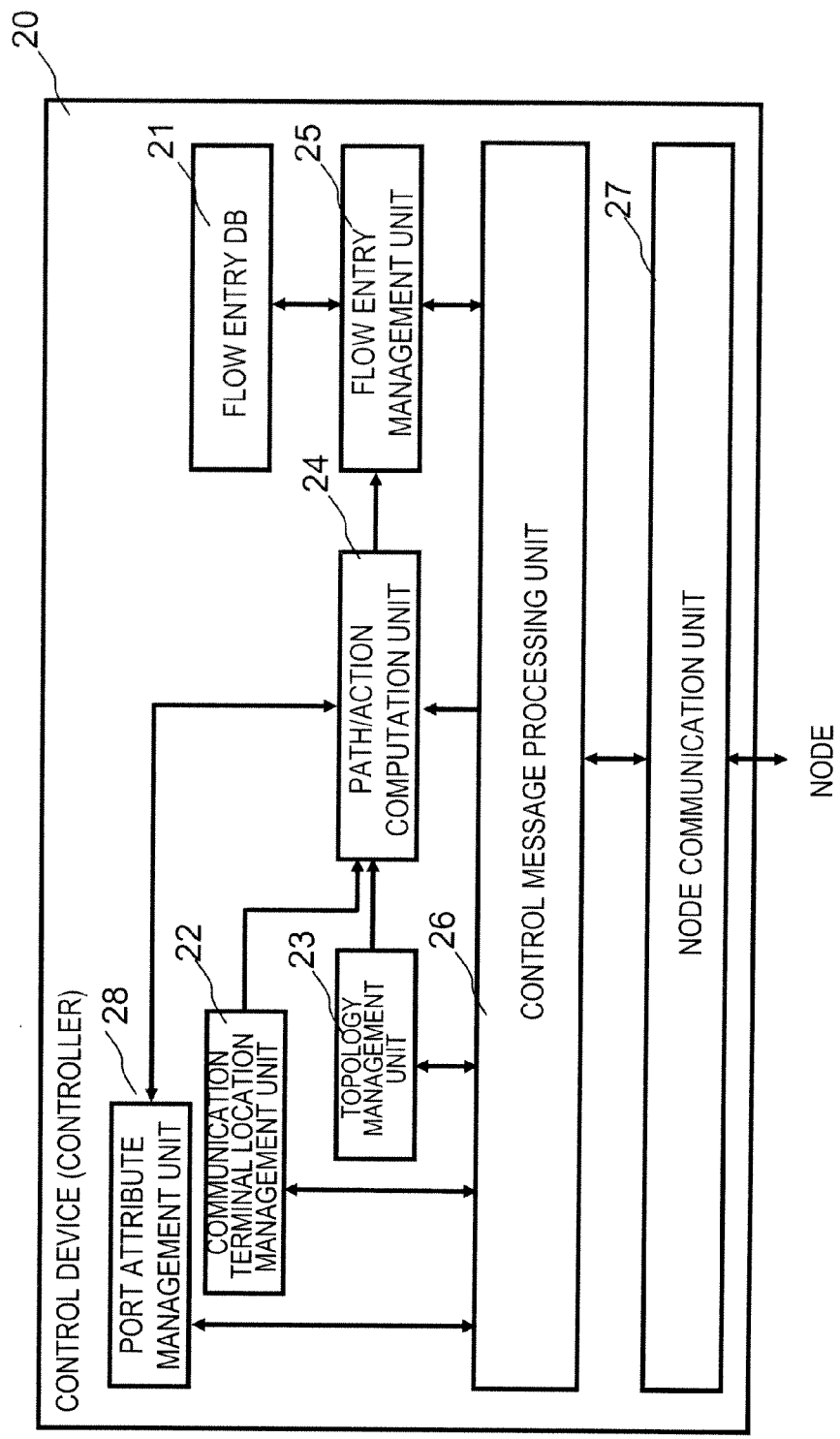
FIG. 2 is a block diagram representing a configuration of a control device of the first exemplary embodiment of the present invention.
Figure 5:
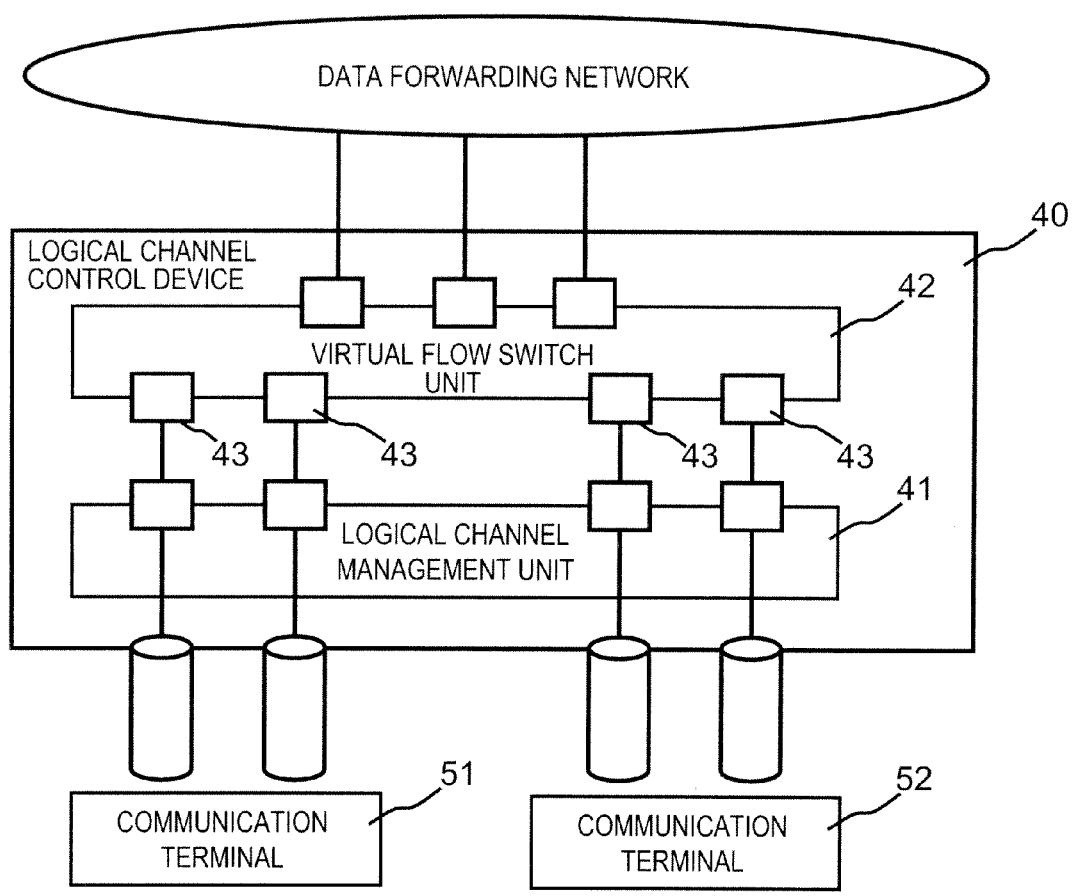
FIG. 5 is a block diagram representing a configuration of a logical channel control device of the first exemplary embodiment of the present invention.

First, an outline of an exemplary embodiment of the present invention is described. In an exemplary embodiment of the present invention, as shown in FIG. 1, FIG. 2, and FIG. 5, a logical channel control device is provided with a logical channel management unit that establishes a logical channel to an external node, and also generates or deletes a virtual port associated with the logical channel established to said external node; and a virtual flow switch unit that performs processing of a received packet based on a processing rule that has been set by a control device, and also gives notification to the control device of creation or deletion of the virtual port; wherein the control device can be realized by a configuration that identifies the external node (a communication terminal in FIG. 1, a VPN client in FIG. 24, or the like) and a server that the external node is attempting to access, and that computes a forwarding path of a packet, based on network attribute information (for example, PDN identification information) associated with the notified port.

The control device sets a processing rule realizing the forwarding path to each forwarding node in the computed packet forwarding path. According to the above, it is possible to appropriately forward respective duplicated packets in private IP address spaces.

(First Exemplary Embodiment)

Continuing, a detailed description is given concerning the first exemplary embodiment of the present invention making reference to the drawings. FIG. 1 is a diagram for describing a configuration of a communication system according to the first exemplary embodiment of the present invention. Referring to FIG. 1, a control device 20, forwarding nodes 30 to 32, and a logical channel control device 40 are shown. It is to be noted that the example of FIG. 1 is an embodiment in which one logical channel control device 40 and three forwarding nodes 30 to 32 are disposed, and two communication terminals 51 and 52, and two servers 61 and 62 in PDNs 11 and 12 are connected, but the respective numbers thereof are merely examples and it is possible to have arbitrary numbers of each thereof.

FIG. 2 is a diagram representing a detailed configuration of the control device 20 of FIG. 1. Referring to FIG. 2, the control device (controller) 20 is configured by being provided with a flow entry database (flow entry DB) 21 that stores processing rules (flow entries), a communication terminal location management unit 22, a topology management unit 23, a path/action computation unit 24, a flow entry management unit 25, a control message processing unit 26, a node communication unit 27 that performs communication with the forwarding nodes 30 to 32 and the logical channel control device 40, and a port attribute management unit 28. These respectively operate as follows.

The communication terminal location management unit 22 manages which network the communication terminals 51 and 52 and the PDNs 11 and 12, that are connected to the communication system 1, belong to, and which port of the logical channel control device and forwarding nodes they are connected to. This location management is performed based on a port generation notification to be described later from the logical channel control device 40, or on a virtual port deletion notification, a new flow detection notification, a flow deletion notification, or the like.

FIG. 3 is a diagram showing an example of a table held in the communication terminal location management unit 22. The table of FIG. 3 is configured by terminal identification information, location information, network attributes, and flow information. The terminal identification information is an identifier for identifying a communication terminal, and in the example of FIG. 3, an IP address of the communication terminal is used. In a case of using information outside of an IP address, such as a MAC address, as the terminal information, an information element indicating the IP address of the communication terminal may be separately added to the table. The location information is information indicating a connection point to the communication system as the location of the communication terminal, and is configured by a switch number and a port number. The network attribute is attribute information of a network to which a corresponding port belongs. The flow information is information of a flow passing the port. The example of FIG. 3 has a description of entries concerning the communication terminal 51 and the communication terminal 52, and the PDN 11 and the PDN 12. It is to be noted that there are two location information entries for each of the communication terminals 51 and 52 because separate upward and downward logical channels are established for communication with a terminal belonging to a PDN.

The topology management unit 23 formulates network topology information based on connection relationships between the forwarding nodes 30 to 32 and the logical channel control device 40 collected via the node communication unit 27.

The path/action computation unit 24 obtains a packet forwarding path and an action to be executed in the forwarding nodes 30 to 32 in the forwarding path, based on location information of a communication terminal managed by the communication terminal location management unit 22, network topology information formulated by the topology management unit 23, and network attribute information managed by the port attribute management unit 28.

The flow entry management unit 25 records a result computed by the path/action computation unit 24 as a processing rule (flow entry) in a flow entry DB 21, and sets a processing rule (flow entry) in accordance with a request for an addition or an update of a processing rule (flow entry) from the logical channel control device 40 or the forwarding nodes 30 to 32.

The control message processing unit 26 analyzes a control message received from the logical channel control device 40 or the forwarding nodes 30 to 32, and delivers control message information to a relevant processing means inside the control device 20.

The port attribute management unit 28 manages which network respective ports of the logical channel control device and the forwarding nodes in the communication system 1 belong to.

FIG. 4 is a diagram showing an example of a table held in the port attribute management unit 28. The table of FIG. 4 is configured by switch numbers, port numbers, and network attributes. Here, a network attribute of "Global" indicates a global network that does not use a private address space.

It is to be noted that, in the abovementioned configuration, with regard to the control device 20, it is possible to omit the flow entry DB 21, in a case where there is no necessity to hold a processing rule (flow entry). Furthermore, it is also possible to use a configuration in which the flow entry DB 21 is provided separately in an external server or the like.

The control device 20 as described above can also be realized by a configuration in which the abovementioned communication terminal location management unit 22 and the port attribute management unit 28 are added, based on an OpenFlow controller of Non-Patent Document 2, and computation of a path and creation of a processing rule (flow entry) are performed, giving consideration to terminal location and network attribute information.

On receiving a packet, the forwarding nodes 30 to 32 find a processing rule (flow entry) having a matching key that matches the received packet, from a flow table storing processing rules (flow entries), and implement processing (for example, forwarding to a specific port, flooding, dropping, and the like) in accordance with an action associated with the processing rule (flow entry).

Furthermore, the forwarding nodes 30 to 32 reset a timer (timeout information) in an action field of the processing rule (flow entry), each time a packet is processed. When the timer becomes 0, the forwarding nodes 30 to 32 delete the processing rule (flow entry) from the flow table. In this way, a situation is prevented where a processing rule (flow entry) that is no longer used remains forever, and an unintended action is executed.

It is to be noted that the forwarding nodes 30 to 32 described above can also be realized by a configuration equivalent to an OpenFlow switch of Non-Patent Document 2.

The logical channel control device 40 manages a logical channel for a communication terminal to connect to the communication system 1, and provides connectivity to the communication system 1.

FIG. 5 is a block diagram representing a detailed configuration of the logical channel control device 40. Referring to FIG. 5, the logical channel control device 40 is configured by being provided with a logical channel management unit 41 and a virtual flow switch unit 42. It is to be noted that a data forwarding network shown in an upper section of FIG. 5 is a network configured by the control device described above and one or more forwarding nodes, and is equivalent to a network formed by the control device 20 and the forwarding nodes 30 to 32 of FIG. 1.

The logical channel management unit 41 is provided with a logical channel management function that generates or releases a logical channel for a communication terminal to transmit and receive a data packet via the communication system 1, a logical channel event notification function that gives notification of an event, such as generation or release of the logical channel, to the virtual flow switch unit 42, and a packet forwarding function between the logical channel and the virtual flow switch unit 42. Furthermore, in the present exemplary embodiment, the logical channel management unit 41 is provided with an IP address management function to give out an IP address to the communication terminals 51 and 52, but, separately from the logical channel management unit 41, it is also possible to have a configuration provided with an IP address management unit that fulfills a role equivalent to the IP address management function.

FIG. 6 is a diagram showing an example of a table held in the logical channel management unit 41. The table of FIG. 6 is formed of a logical channel number, a network attribute, flow information, and an internal IF number. The logical channel number is an identifier for identifying a logical channel established with a communication terminal. The network attribute is attribute information of a network to which a corresponding logical channel belongs. The flow information is information of a flow passing the logical channel. The internal IF number is an identifier for identifying an internal IF (interface) with a corresponding virtual flow switch unit 42.

The virtual flow switch unit 42 has a virtual port management function and a port event notification function added, in addition to functions of the forwarding nodes 30 to 32 described above. The virtual port management function is a function that performs generation/deletion of a virtual port 43 (equivalent to the port numbers in FIG. 3 and FIG. 4) corresponding to respective logical channels, in response to an event of generating/releasing a logical channel notified by the logical channel management unit 41, the function also performing virtual port management.

The port event notification function is a function that gives notification of an event of generation/deletion of the virtual port 43, to the control device 20.

It is to be noted that each unit (processing means) of the logical channel control device 40 shown in FIG. 5 can also be realized by a computer program that executes each of the abovementioned processes on a computer forming the logical channel control device 40, using hardware thereof.

Figure 7:
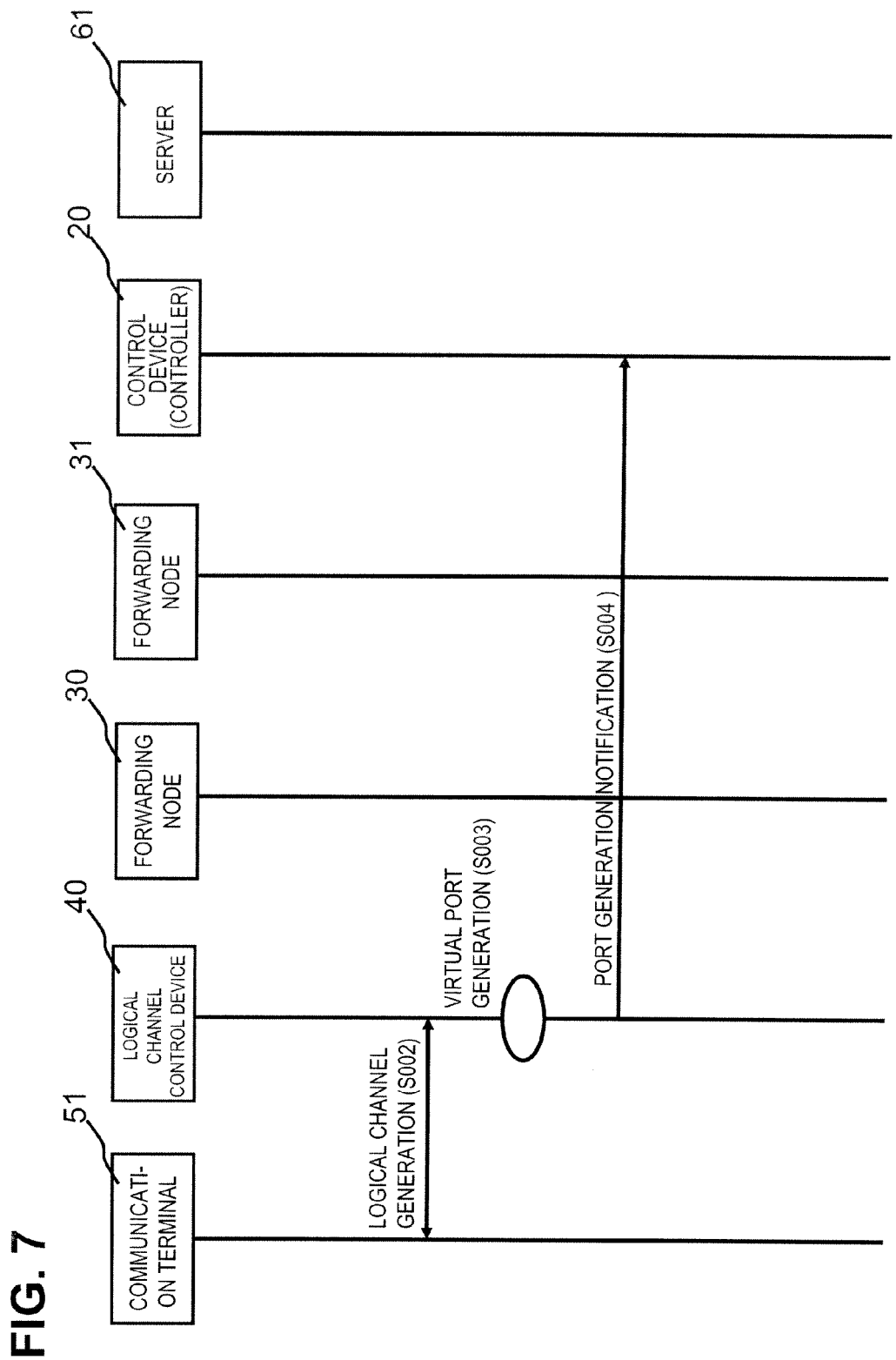
FIG. 7 is a sequence diagram showing operation of the first exemplary embodiment of the present invention.

Next, a detailed description is given concerning the first exemplary embodiment of the present invention making reference to the drawings. FIG. 7 is a sequence diagram showing operation of the first exemplary embodiment of the present invention. FIG. 7 shows the communication terminal 51 connecting to the communication system 1, that is, a series of steps up to generating a logical channel in order to access the logical channel control device 40 and the PDN 11.

Referring to FIG. 7, first, the communication terminal 51 generates a logical channel in order to access the PDN 11, with the logical channel control device 40 (step S002). When generating the logical channel, the communication terminal 51 gives notification of information of flow passing through the logical channel, in addition to PDN identification information indicating the PDN 11 as network attribute information. In this way, the communication terminal 51 explicitly gives notification to the logical channel control device 40 that the logical channel is a logical channel in order to access the PDN 11. A description was given with regard to the flow information belonging to the logical channel and the PDN identification information, in which notification is given by the communication terminal 51 to the logical channel control device 40, but downloading from a separately provided subscriber information database (not shown in FIG. 1) is also possible.

Furthermore, when a logical channel is generated, the logical channel control device 40 gives out an IP address used when accessing the PDN 11, with respect to the communication terminal 51. The IP address given to the communication terminal 51 may also be downloaded from the subscriber information database, similar to the abovementioned flow information and PDN identification information.

When the logical channel to the communication terminal 51 is generated. the logical channel control device 40 generates a virtual port 43 corresponding to the logical channel (step S003). Specifically, the logical channel management unit 41 of the logical channel control device 40 gives notification of logical channel generation to the virtual flow switch unit 42. At this time, the logical channel management unit 41 also gives notification of the IP address of the communication terminal 51 associated with the logical channel, flow information, and PDN identification information. Here, notification of the IP address of the communication terminal 51 is also possible in the form of a portion of the flow information. Furthermore, notification together with QoS information associated with the logical channel is also possible. On receiving the logical channel generation notification, the virtual flow switch unit 42 generates the virtual port 43 associated with the logical channel. The virtual port 43 is connected to the logical channel management unit 41 via an internal interface of the logical channel control device 40. Thus, the logical channel management unit 41 can also recognize a correspondence relationship between the virtual port 43 and the logical channel. As a result, the logical channel management unit 41 can forward a data packet that has been inputted by the virtual port 43, to the corresponding logical channel.

When the virtual port 43 is generated, the virtual flow switch unit 42 inside the logical channel control device 40 transmits a port generation notification indicating the generation of the virtual port 43, to the control device 20 (step S004). This port generation notification includes a forwarding node identifier for identifying the virtual flow switch unit

42, a port identifier assigned to the virtual port 43, an IP address associated with the virtual port, flow information, and PDN identification information. It is to be noted that notification of the IP address in the form of a portion of the flow information is also possible. Furthermore, notification together with QoS information associated with the logical channel is also possible.

On receiving the port generation notification, the control device 20 records a correspondence relationship between the communication terminal 51, and the notified port and a network attribute, in the communication terminal location management unit 22. Furthermore, the control device 20 records a correspondence relationship between the notified port and a network attribute (PDN identification information) in the port attribute management unit 28.

In FIG. 7, only one logical channel is established, but in actuality a total of two logical channels, upward and downward, are established.

Figure 8:
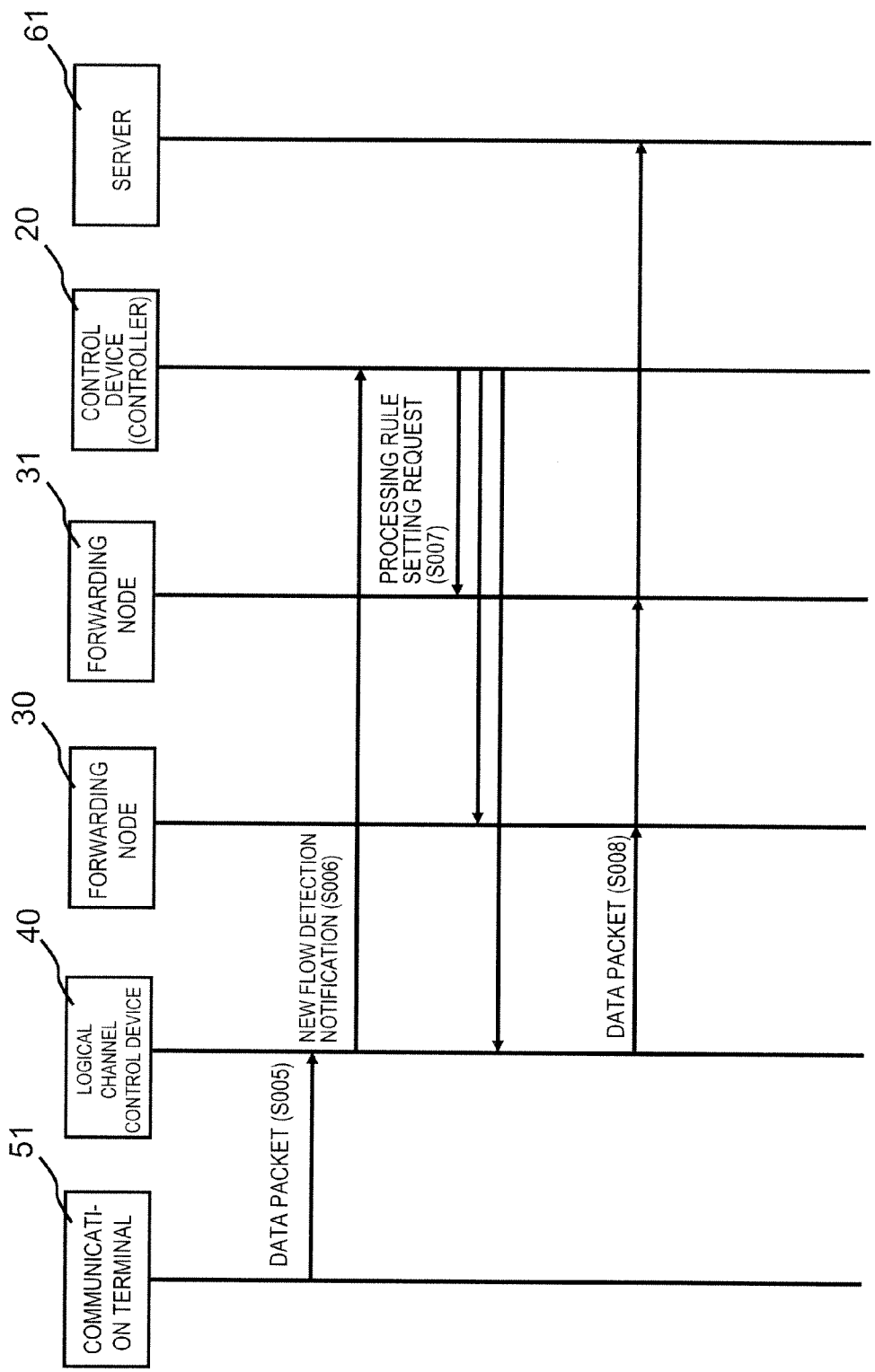
FIG. 8 is a continuation diagram of FIG. 7.

FIG. 8 is a diagram for describing a procedure, after creating the virtual port, up to where the communication terminal 51 starts communication with a server 61 inside the PDN 11. Referring to FIG. 8, first, when the communication terminal 51 transmits a data packet with a destination of the server 61 via the logical channel (step S005), the data packet reaches the logical channel control device 40 where the logical channel ends. Here, a VLAN ID of the data packet is ID#0.

On receiving the data packet, the logical channel control device 40 transfers the data packet from the logical channel management unit 41 to the virtual flow switch unit 42, via an internal interface that corresponds to the logical channel.

On receiving the data packet, the virtual flow switch 42 searches the flow table, and retrieves a processing rule having a matching key that matches the received packet. However, since the packet is the first packet after the communication terminal 51 connects to the logical channel control device 40, there is no relevant processing rule. Therefore, after buffering the received packet, the virtual flow switch unit 42 transmits a new flow detection notification (Packet-In) to the control device 20 (step S006). The new flow detection notification includes information necessary for identifying creating a processing rule (for example, a MAC address, an IP address, a port number, (including source and destination of each thereof), a VLAN ID), and receiving port identifier of the packet (port identifier of the virtual port). It is to be noted that in the present exemplary embodiment, a description is given where the virtual flow switch unit 42 sends information necessary for identification/creation of a processing rule to the control device 20, but it is also possible to transmit a received packet as it is, to the control device 20.

On receiving the new flow detection notification, the control device 20 determines that this flow is a flow that belongs to the PDN 11, from a receiving port identifier (port identifier of a virtual port) included in the new flow detection notification, based on a correspondence relationship between a port managed by the port attribute management unit 28 and a network attribute (PDN identification information). The control device 20 identifies that a communication partner of the communication terminal 51 is the server 61, based on information necessary for identification/creation of a processing rule included in the new flow detection notification and information managed by the communication terminal location management unit 22. Furthermore, the control device 20 determines a matching key of the processing rule that is newly set, and also performs confirmation of the location of the server 61 that is a destination, and computes a packet forwarding path from the communication terminal 51 to the server 61. Here, as a result of the path computation, a path is computed in which a packet is forwarded in a sequence of the logical channel control device 40, the forwarding node 30, and the forwarding node 31. Furthermore, with regard to the matching key, a determination is made of a matching key where, in addition to the VLAN ID and a receiving port of the packet, a source IP address is an IP address given to the communication terminal 51, and a destination MAC address and a destination IP address are the respective addresses of the server 61. In addition, a determination is assumed in which an action is performed to embed an ID# 1 in the VLAN ID by the logical channel control device 40 that is the first forwarding node in the computed path, and to embed an ID# 0, which is the original value, in the VLAN ID by the forwarding node 31 that is the final forwarding node in the computed path.

In addition, the control device 20 computes an action to realize the forwarding path, transmits processing rules having the matching key and action to each of the logical channel control device 40, the forwarding node 30, and the forwarding node 31 in the forwarding path, and requests processing rule setting (step S007).

After setting the abovementioned processing rules, the control device 20 records each of the processing rules in the flow entry DB 21.

When the setting of the processing rules is complete, the virtual flow switch unit 42 of the logical channel control device 40 changes the VLAN ID of the packet that is buffered in accordance with a processing rule to ID# 1, and then transmits the packet (step S008). Since setting of processing rules has already been performed in the forwarding nodes 30 and 31 in the forwarding path of the packet, this packet is transmitted from the forwarding node 30 to the forwarding node 31. On receiving the packet, the forwarding node 31 changes the VLAN ID of the packet to ID# 0, which is the original value, and transmits the packet to the server 61.

Figure 9:
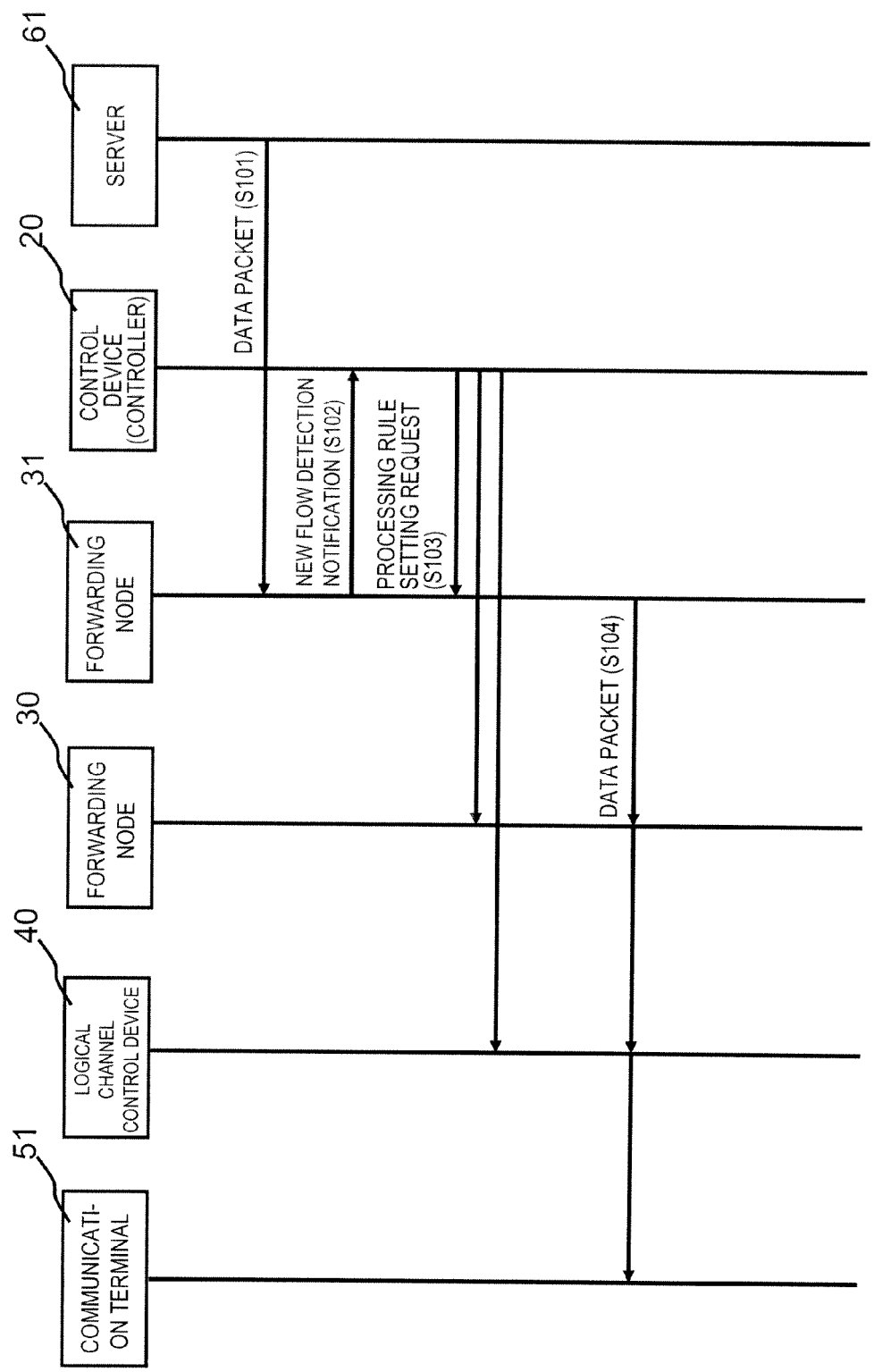
FIG. 9 is a continuation diagram of FIG. 8.

FIG. 9 is a diagram for describing a procedure by which the server 61 that has received the data packet from the communication terminal 51 as described above, transmits the data packet to the communication terminal 51. Referring to FIG. 9, first, when the server 61 transmits the data packet with a destination of the communication terminal 51 (step S101), the data packet reaches the forwarding node 31. Here, the VLAN ID of the data packet is assumed to be ID# 0.

On receiving the data packet, the forwarding node 31 searches the flow table and retrieves a processing rule having a matching key that matches the received packet. However, since the packet is the first packet transmitted by the server 61 to the communication terminal 51, there is no relevant processing rule. Therefore, after buffering the received packet, the forwarding node 31 transmits a new flow detection notification (Packet-In) to the control device 20 (step S102).

On receiving the new flow detection notification, the control device 20 determines that this flow is a flow that belongs to the PDN 11, from a receiving port identifier (port identifier of a virtual port) included in the new flow detection notification, based on a correspondence relationship between a port managed by the port attribute management unit 28 and a network attribute (PDN identification information). The control device 20 identifies that the destination of this packet is the communication terminal 51, based on information necessary for identification/creation of a processing rule included in the new flow detection notification and information managed by the communication terminal location management unit 22. Furthermore, the control device 20 determines a matching key of the processing rule that is newly set, and also computes a packet forwarding path from the server 61 to the communication terminal 51. At this time, the control device 20 computes the forwarding path of the flow so as to output to a virtual port corresponding to the logical channel established so that the communication terminal 51 accesses the PDN 11, based on information managed by the communication terminal location management unit 22.

Here, as a result of the path computation, a path is computed in which a packet is forwarded in a sequence of the forwarding node 31, the forwarding node 30, and the logical channel control device 40. Furthermore, with regard to the matching key, a determination is made of a matching key where, in addition to a VLAN ID and a receiving port for the packet, a source MAC address and a source IP address are respective addresses of the server 61, and a destination IP address is an IP address given to the communication terminal 51. It is to be noted that here also a determination is assumed in which an action is performed to embed an ID# 1 in the VLAN ID by the forwarding node that is the first forwarding node in the computed path, and to embed an ID# 0, which is the original value, in the VLAN ID by the logical channel control device 40 that is the final forwarding node in the computed path.

In addition, the control device 20 computes an action to realize the forwarding path, transmits a processing rule having the respective matching keys and actions, to the forwarding node 31, the forwarding node 30, and the logical channel control device 40 in the forwarding path, and requests processing rule setting (step S103).

After setting the abovementioned processing rule, the control device 20 records each of the processing rules in the flow entry DB 21.

When the setting of the processing rules is complete, the forwarding node 31 changes the VLAN ID of the packet that is buffered in accordance with a processing rule, to ID# 1, and then 815 performs forwarding (step S104). Since setting of processing rules has already been performed in the forwarding node 31 and the logical channel control device 40, in the forwarding path of the packet, this packet is transmitted from the forwarding node 31 to the forwarding node 30, and from the forwarding node 31 to the logical channel control device 40. On receiving the packet, the logical channel control device 40 changes the VLAN ID of the packet to ID# 0, which is the original value, after which the packet is made to reach the communication terminal 51 via the logical channel.

It is to be noted that in a case where, in the abovementioned state, another communication terminal 52 establishes a logical channel to the logical channel control device 40, as shown in FIG. 7, the logical channel control device 40 generates a virtual port corresponding to this, and notifies the control device 20. With regard to the control device 20, since the information necessary for identification/creation of a processing rule and the receiving port identifier (a port identifier of the virtual port) of the packet are included, as described above, in the new flow notification with respect to the data packet of the communication terminal 52, the control device can identify the two and generate a new processing rule (flow entry). Furthermore, since an identifier for uniquely identifying a flow within the communication system in which a plurality of different private IP address spaces are mixed is embedded in the data packet (the VLAN ID in the present embodiment), by including the identifier in a matching key in another forwarding node in the path, it is possible to identify both thereof, and to generate a new processing rule (flow entry).

Figure 10:
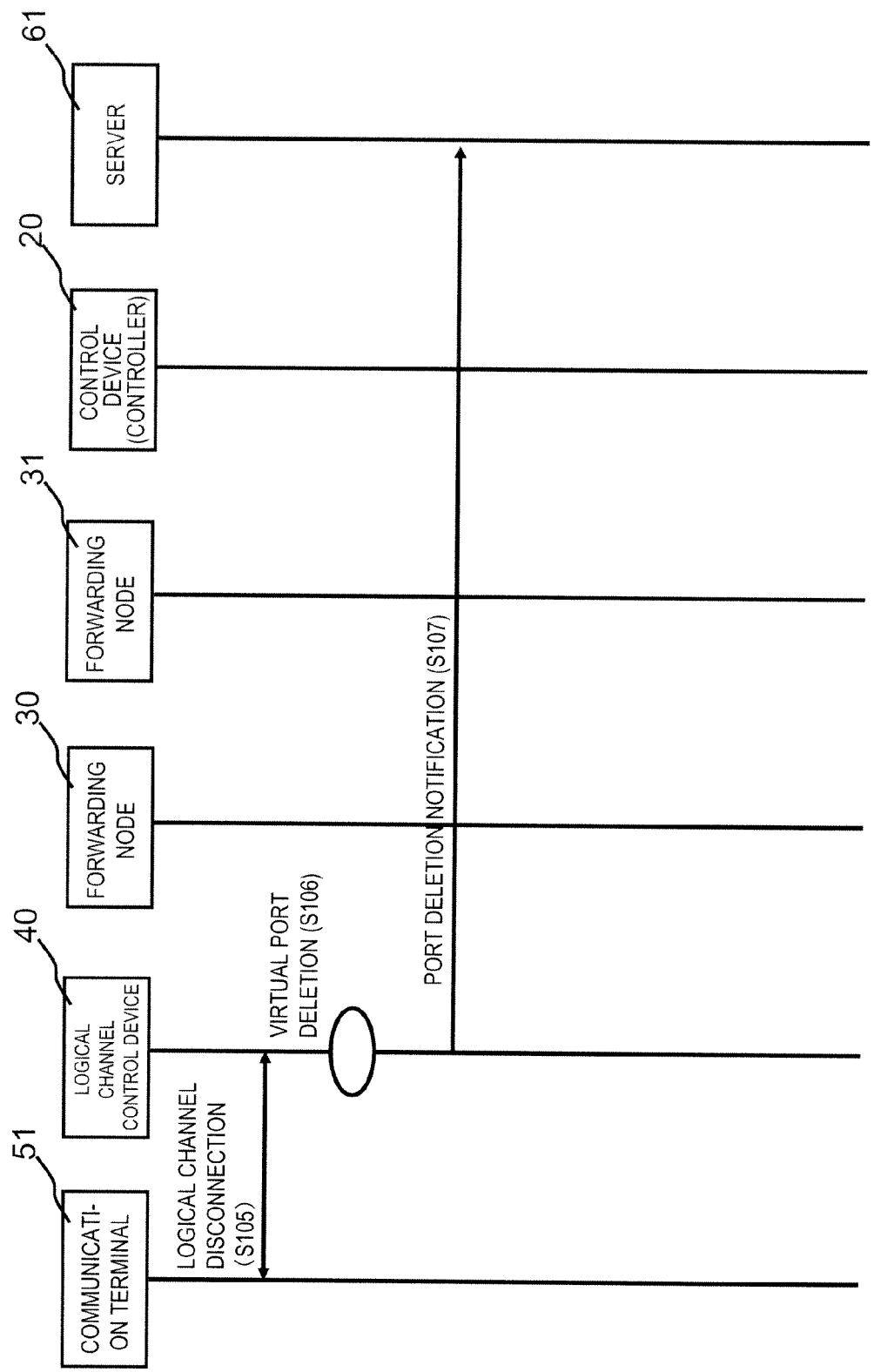
FIG. 10 is a continuation diagram of FIG. 9.

FIG. 10 is a diagram for describing disconnection of the communication terminal 51 from the communication system 1, that is, steps as far as disconnecting the logical channel established with the logical channel control device 40 in order to access the PDN 11.

Referring to FIG. 10, first, the communication terminal 51 releases the logical channel for accessing the PDN 11 (step S105; disconnecting the logical channel). When the logical channel to the communication terminal 51 is released, the logical channel control device 40 deletes the virtual port corresponding to the logical channel (step S106). Specifically, the virtual flow switch unit 42 inside the logical channel control device 40 performs processing to delete the virtual port associated with the logical channel, based on a notification (logical channel release) from the logical channel management unit 41.

When the virtual port 43 is deleted, the virtual flow switch unit inside the logical channel control device 40 transmits a port deletion notification to the control device 20 (step S107). This port deletion notification includes a forwarding node identifier for identifying the virtual flow switch unit 42, and a port identifier assigned to the virtual port 43.

On receiving the port deletion notification, the control device 20 deletes the correspondence relationship between the communication terminal 51 and the notified virtual port, which is recorded in the communication terminal location management unit 22. Furthermore, the control device 20 deletes a correspondence relationship between the notified port and a network attribute, which was recorded in the port attribute management unit 28.

As described above, since the present exemplary embodiment is configured to generate/delete a virtual port that has a network attribute in accordance with generation/deletion of a logical channel, it is possible to identify and transmit respective duplicated packets in private IP address spaces (for example, packets having an identical private IP address as a destination IP address, but where network attribute information or connection port numbers in a virtual flow switch unit are different).

It is to be noted that in the abovementioned exemplary embodiment, the communication terminal 51 only established one logical channel, upward and downward, but it is also possible to simultaneously establish two or more logical channels, upward and downward, respectively.

Furthermore, in the abovementioned exemplary embodiment, on receipt of the port generation notification, the control device 20 records the correspondence relationship between the communication terminal 51 and the virtual port and network attribute in the communication terminal location management unit 22, but it is also possible to record this information on receipt of the new flow detection notification (Packet-In).

Furthermore, in the abovementioned exemplary embodiment, a description was given where the communication terminal establishes a logical channel to the logical channel control device 40, but it is also possible for a device to establish a logical channel with another external node, for example, a logical channel control device for accessing a PDN from a network in the background.

Furthermore, in the abovementioned exemplary embodiment, a description was given in which, on receipt of the new flow detection notification from the forwarding node, the control device 20 sets a processing rule, but it is also possible to predict an occurrence of flow in advance and to set the processing rule in advance. In addition, it is also possible to have a configuration where the control device 20 computes a packet forwarding path giving consideration to QoS, based on QoS information or the like included in the port generation notification. Furthermore, a configuration is also possible in which the control device 20 identifies the location of a communication terminal based on flow information included in the port generation notification, and computes the packet forwarding path.

(Second Exemplary Embodiment)

Next, a detailed description is given concerning a second exemplary embodiment of the present invention, in which a modification is added to a configuration of the logical channel control device of the first exemplary embodiment, with reference being made to the drawings. Since the present exemplary embodiment has a configuration that is basically the same as the first exemplary embodiment, a description is given below centered on points of difference therefrom.

FIG. 11 is an example of a table held in a communication terminal location management unit 22 of a control device of the second exemplary embodiment of the present invention. As will be described later, there are fewer terminal identification information entries in comparison with a table (FIG. 3) held in the communication terminal location management unit 22 of the first exemplary embodiment, since a virtual port is generated for each item of PDN identification information.

FIG. 12 is an example of a table held in a port attribute management unit 28 of the control device of the second exemplary embodiment of the present invention. There are fewer port attribute entries for a logical channel control device 40, in comparison with a table (FIG. 4) held in the port attribute management unit 28 of the first exemplary embodiment.

Figure 13:
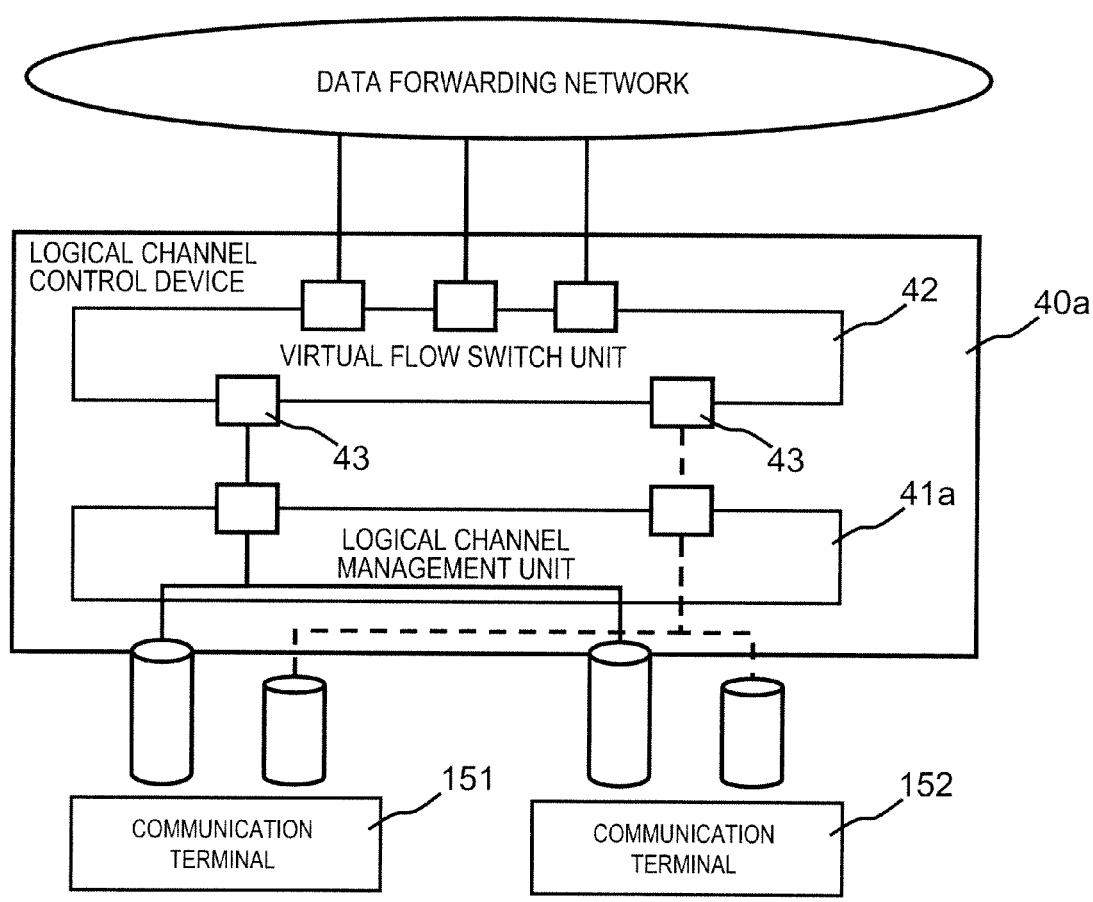
FIG. 13 is a block diagram representing a configuration of a logical channel control device of the second exemplary embodiment of the present invention.

FIG. 13 is a diagram for describing a configuration of the logical channel control device according to the second exemplary embodiment of the present invention. A point of difference from the logical channel control device of the first exemplary embodiment of the present invention is generation granularity of virtual ports of the logical channel control device. There is a point that in the first exemplary embodiment, the virtual flow switch unit 42 generated virtual ports in units of logical channels established between a communication terminal 51 (52) and the logical channel control device 40, but in the present exemplary embodiment, virtual ports are generated in plural logical channel units, having a common parameter. Here, a description is given using PDN identification information as a common parameter.

Referring to FIG. 13, a logical channel control device 40*a* is shown, which is provided with a logical channel management unit 41*a* 960 and a virtual flow switch unit 42.

The logical channel management unit 41*a* is provided with a logical channel management function that generates or releases a logical channel for a communication terminal to transmit and receive a data packet via the communication system 1, a logical channel event notification function that gives notification of an event such as generation or release of the logical channel for each PDN, to the virtual flow switch unit 42, and an IP address management function to given an IP address to the communication terminals 51 and 52.

Furthermore, in the present exemplary embodiment, the logical channel management unit 41*a* is provided with an IP address management function to give an IP address to the communication terminals 51 and 52, but, separately from the logical channel management unit 41*a*, it is also possible to have a configuration provided with an IP address management unit that fulfills a role equivalent to the IP address management function.

FIG. 14 is a diagram showing an example of a table held in the logical channel management unit 41*a*. This is almost the same as a table (FIG. 6) held in the logical channel management unit 41 of the first exemplary embodiment, but since a virtual port is generated for each item of PDN identification information, internal IF numbers are fewer.

The virtual flow switch unit 42 has a virtual port management function and a port event notification function added, in addition to functions of forwarding nodes 30 to 32 described above. The virtual port management function is a function that performs generation/deletion of a virtual port 43 corresponding to respective logical channels, in response to an event of generating/releasing a logical channel for each PDN notified by the logical channel management unit 41*a*, the function also performing virtual port management.

The port event notification function is a function that gives notification of an event such as generation/deletion of the virtual port 43, to the control device 20.

Next, a description is given concerning operation of the present exemplary embodiment. Since operation of the present exemplary embodiment is approximately in common with the first exemplary embodiment described above, a description is given below of a sequence flow by reading the logical channel control device 40 of FIGS. 7 to 10 as the logical channel control device 40*a*.

Flow up to where the communication terminal 51 of FIG. 7 generates a logical channel to the logical channel control device 40*a* is the same as the first exemplary embodiment described above (step S002 in FIG. 7).

When the logical channel to the communication terminal 51 is generated, the logical channel control device 40*a* generates a virtual port corresponding to a PDN (step S003 in FIG. 7). Specifically, when the logical channel to the communication terminal 51 is generated, the logical channel management unit 41*a* of the logical channel control device 40*a* confirms whether or not there is a virtual port corresponding to a PDN 11, to which this logical channel belongs, in the virtual flow switch unit 42. In this regard, when the logical channel management unit 41*a* requests generation of a virtual port for the PDN 11, with respect to the virtual flow switch unit 42, notification is given together with PDN identification information, and in a case where a virtual port corresponding to the PDN 11 exists, realization is possible without generating a new virtual port and performing subsequent processing.

On receiving a request to generate a new virtual port, the virtual flow switch unit 42 generates a virtual port associated with the PDN 11. The virtual port 43 is connected to the logical channel management unit 41*a* via an internal interface of the logical channel control device 40*a*. As a result, the logical channel management unit 41*a* can also recognize a correspondence relationship between the virtual port 43 and the PDN. As a result, the logical channel management unit 41*a* can identify the PDN to which a data packet inputted from the virtual port 43 belongs.

When the virtual port 43 is generated, the virtual flow switch unit 42 inside the logical channel control device 40*a* transmits a port generation notification to the control device 20 (step 5004 in FIG. 7). This port generation notification includes a forwarding node identifier for identifying the virtual flow switch unit 42, a port identifier assigned to the virtual port 43, and PDN identification information associated with the virtual port.

On receiving the port generation notification, the control device 20 records a correspondence relationship between a network attribute and the notified port (refer to FIG. 12).

Thereafter, as shown in FIG. 8, on receiving a data packet from the communication terminal 51 with a destination of a server 61, the logical channel control device 40*a* transfers the data packet from the logical channel management unit 41*a* to the virtual flow switch unit 42, via an internal interface corresponding to the PDN 11 to which the logical channel belongs.

Subsequent data packet transmission and reception processing, in FIG. 9 and FIG. 10, is only the addition of processing by which the control device 20, on receiving a new flow detection notification (Packet-In), records a correspondence relationship between the communication terminal 51 and a virtual port and network attribute, in the communication terminal location management unit 22, and since this is the same as the first exemplary embodiment, a detailed description is omitted.

Thereafter, as shown in FIG. 10, when the logical channel for the communication terminal 51 to access the PDN 11 is disconnected (step S105 in FIG. 10), the logical channel control device 40*a* deletes the virtual port corresponding to this logical channel (step 5106 in FIG. 10). Specifically, the logical channel management unit 41*a* inside the logical channel control device 40*a* confirms whether or not there is a logical channel belonging to the PDN 11 outside of this disconnected logical channel. Here, since there is no logical channel belonging to the PDN 11, the logical channel management unit 41*a* requests release of the virtual port with respect to the virtual flow switch unit 42. On receiving the request to release the virtual port, the virtual flow switch unit 42 deletes the corresponding virtual port.

When the virtual port is deleted, the virtual flow switch unit 42 inside the logical channel control device 40*a* transmits a port deletion notification to the control device 20 (step 5107 in FIG. 10). This port deletion notification includes a forwarding node identifier for identifying the virtual flow switch unit 42, and a port identifier assigned to the virtual port 43.

On receiving the port deletion notification, the control device 20 deletes a correspondence relationship between the network attribute and the notified port, recorded in the port attribute management unit 28 (refer to FIG. 12).

As described above, the present invention can be realized also by a configuration in which a plurality of logical channels are taken together in PDN units and a virtual port is generated/deleted. It is to be noted that in the abovementioned exemplary embodiment, only PDN identification information is used as a common parameter putting a plurality of logical channels together, but it is also possible to have one communication terminal connected to the same PDN, and a plurality of logical channels with differing QoS information put together.

Otherwise, in the present exemplary embodiment it is possible to modify, as appropriate, timing of establishing/releasing the logical channel, the number of logical channels established by the communication terminal 51, a trigger for setting a processing rule by the control device 20, and the like.

(Detailed Embodiment)

Figure 15:
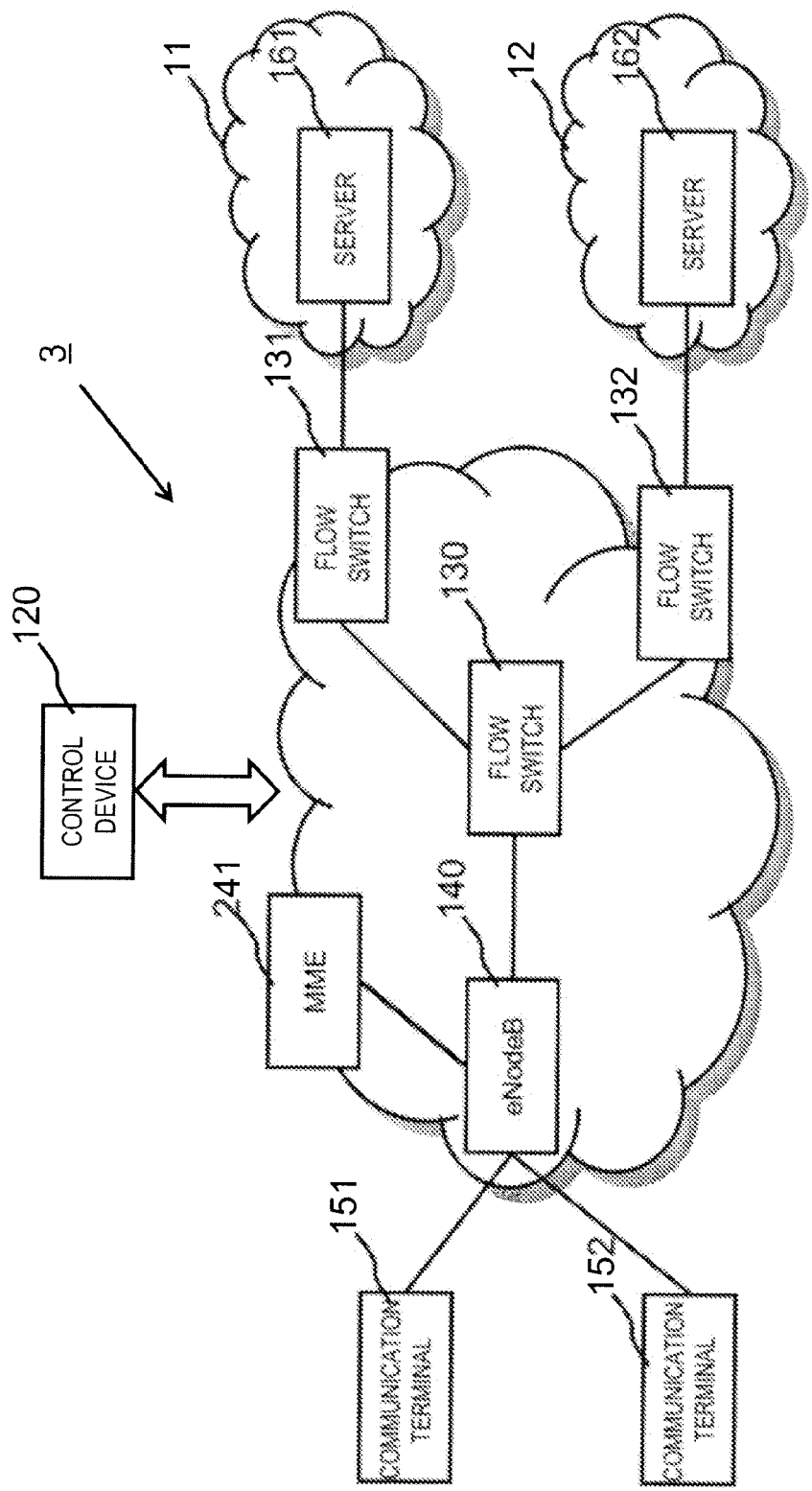
FIG. 15 is a diagram representing a configuration of a specific example of the present invention.

Next, a detailed embodiment is illustrated, and more specifically, a description is given of the first exemplary embodiment described above. FIG. 15 is a diagram representing a configuration of a detailed embodiment of the present invention. Referring to FIG. 15, a control device 120, flow switches (OpenFlow switches) 130 to 132, an eNodeB 140, and a MME 241 are shown.

By setting a processing rule in the flow switches 130 to 132 and the eNodeB 140, the control device 120 performs path control so that a terminal connected to a communication system 3 performs communication. More specifically, a network topology management function, a communication terminal location management function, a processing rule generation function, a path computation function, a processing rule management function, a flow switch management function, and a port attribute management function are provided. This type of control device 120 can be configured based on, for example, an OpenFlow controller of Non-Patent Document 2.

The network topology management function is a function to store a network topology formed by a group of flow switches, based on information collected from the flow switches, and corresponds to a topology management unit 23 of FIG. 2.

The communication terminal location management function is a function to manage which network a PDN and a communication terminal connected to the communication system 3 belong to, and which flow switch (including eNodeB 140) is connected to which port, and the function corresponds to a communication terminal location information management unit 22 of FIG. 2.

The processing rule generation function is a function to determine a matching key and action content, by a function to create a processing rule to be described later, and a path/action computation unit 24 and flow entry management unit 25 of FIG. 2 correspond thereto.

The path computation function is a function to compute a forwarding path of a packet for each flow, and a path computation function of the path/action computation unit 24 of FIG. 2 corresponds thereto.

The processing rule management function is a function to manage what type of processing rule is set in which flow switch, and the flow entry management unit 25 of FIG. 2 corresponds thereto.

The flow switch management function is a function to control a flow switch, and a control message processing unit 26 of FIG. 2 corresponds thereto.

The port attribute management function is a function to manage which network each port of flow switches (including the eNodeB 140) inside the communication system 3 belongs to, and a port attribute management unit 28 of FIG. 2 corresponds thereto.

The flow switches 130 to 132 correspond to forwarding nodes 30 to 32 of the first exemplary embodiment described above, and are devices that perform packet forwarding, based on a processing rule set by the control device 120. These flow switches 130 to 132 can be configured, for example, by an OpenFlow switch of Non-Patent Document 2.

The eNodeB 140 corresponds to the logical channel control device 40 of the first exemplary embodiment described above, and is realized by a base station apparatus or the like that manages a logical channel for a communication terminal to connect to the communication system 3, and that provides connectivity to the communication system 3.

Figure 16:
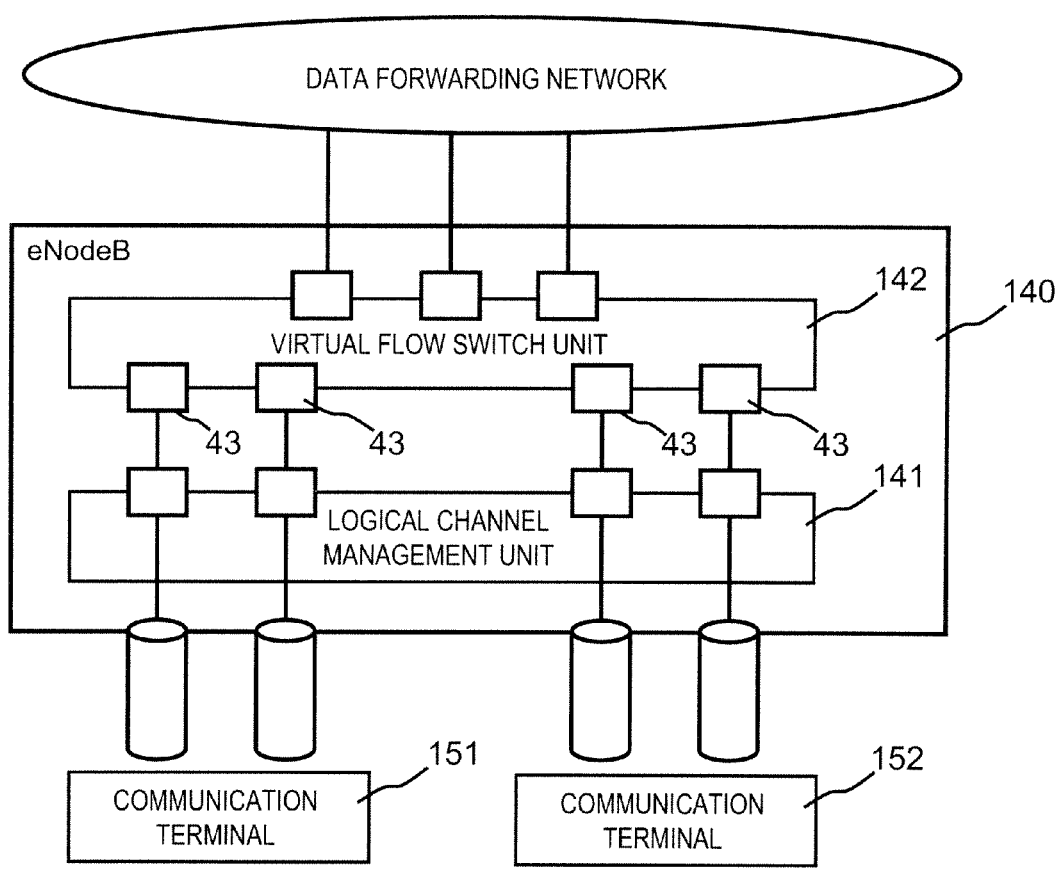
FIG. 16 is a block diagram representing a specific configuration of an eNodeB of FIG. 15.

FIG. 16 is a block diagram representing a specific configuration of the logical channel control device of FIG. 15. As shown in FIG. 16, the eNodeB 140 is provided with a logical channel management unit 141 and a virtual flow switch unit 142.

The logical channel management unit 141 is provided with a link control function to establish or disconnect a link with a communication terminal, a bearer management function to generate or release a bearer so that the communication terminal transmits and receives a data packet via the communication system 3, a bearer event notification function to give notification of an event such as generation or release of a bearer to the virtual flow switch unit 142, a packet forwarding function between the bearer and the virtual flow switch unit 142, and an IP address management function to give an IP address to the communication terminal. Furthermore, in the present detailed embodiment, the logical channel management unit 141 is provided with an IP address management function to give an IP address to the communication terminal, but, separately from the logical channel management unit 141, it is also possible to have a configuration provided with an IP address management unit that fulfills a role equivalent to the IP address management function.

The virtual flow switch unit 142 is provided with a virtual port management function and a port event notification function added, in addition to functions corresponding to the flow switches 130 to 132 described above. The virtual port management function is a function that performs generation/deletion of virtual ports corresponding to respective bearers, in response to an event of generating/releasing a bearer notified by the logical channel management unit 141, the function also performing virtual port management. The port event notification function is a function that gives notification of an event of generation/deletion of a virtual port, to the control device 120.

Next, a detailed description is given concerning overall operation, making reference to sequence diagrams of FIG. 17 to FIG. 20.

Figure 17:
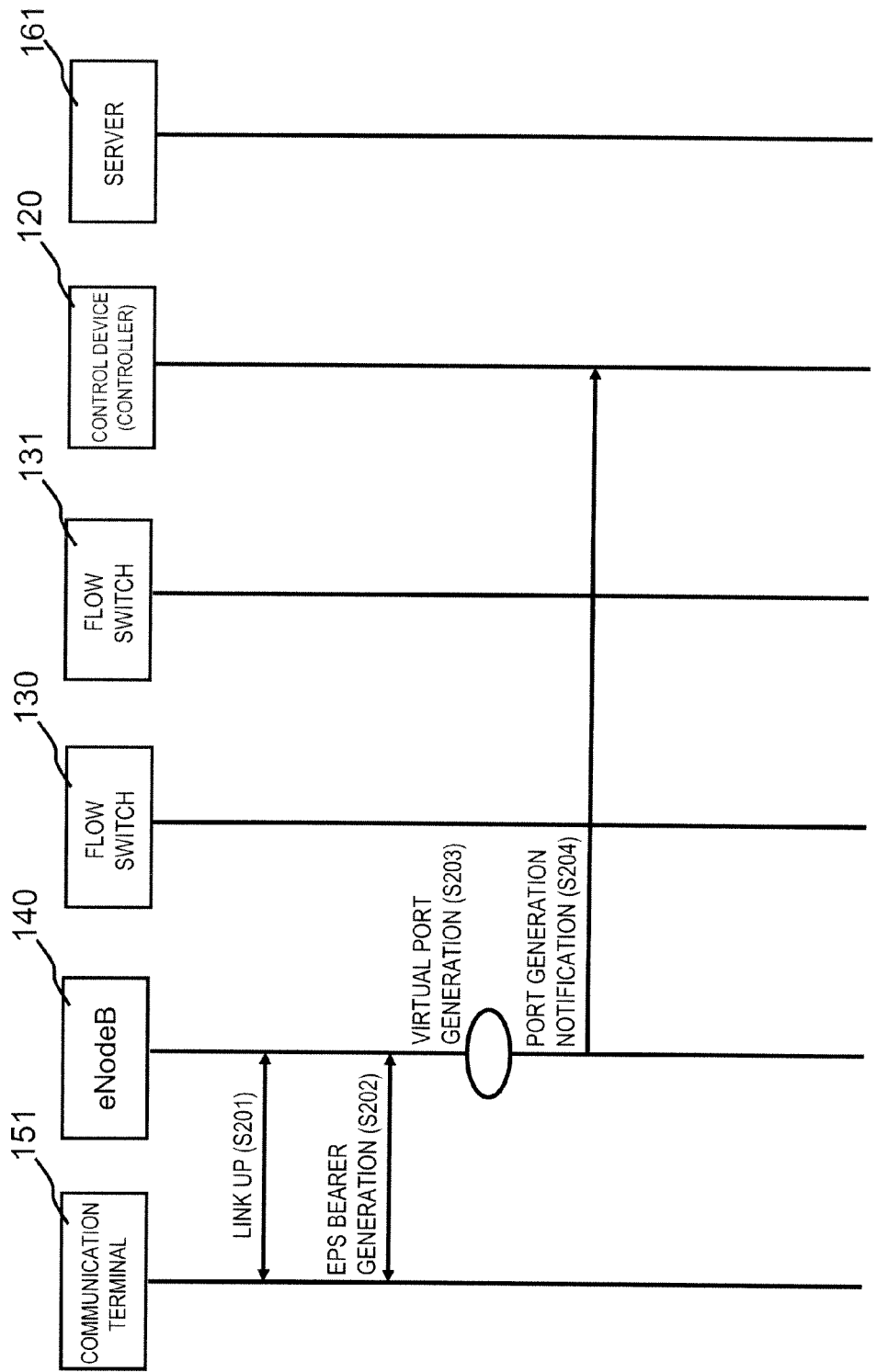
FIG. 17 is a sequence diagram showing operation of a specific example of the present invention.

First, using FIG. 17, a description is given of a series of steps by which the communication terminal 151 connects to the communication system 3, that is, as far as establishing a link to the eNodeB 140 and generating a bearer in order to have access to the PDN 11.

First, the communication terminal 151 performs a linkup with the eNodeB 140 (step S201). Continuing, the communication terminal 151 generates a bearer with the eNodeB 140 in order to access the PDN 11 (step S202). When generating the bearer, the communication terminal 151 gives notification of an APN indicating the PDN 11, together with flow information passing through the bearer, so as to explicitly give notification to the eNodeB 140 that the bearer is a bearer for accessing the PDN 11. Furthermore, at a time of generating the bearer, the eNodeB 140 gives an IP address used when accessing the PDN II, to the communication terminal 151.

It is to be noted that in the example of FIG. 17, the APN and flow information belonging to the bearer are notified to the eNodeB 140 by the communication terminal 151, but it is also possible to have a configuration in which downloading is performed from a Home Subscriber Server (HSS: omitted in the drawings). Furthermore, it is also possible to have a configuration in which the IP address given to the communication terminal 151 is also downloaded from a HSS in the same way.

When the bearer to the communication terminal 151 is generated, the eNodeB 140 generates a virtual port corresponding to this bearer (step S203).

Specifically, the logical channel management unit 141 that is a function inside the eNodeB 140 gives notification of the bearer generation to the virtual flow switch unit 142. At this time, the logical channel management unit 41 also gives notification of the IP address of the communication terminal 151 associated with the bearer, flow information, and APN. On recognizing generation of a new bearer, the virtual flow switch unit 142 generates a virtual port associated with this bearer. The virtual port is connected to the logical channel management unit 141 by an internal interface of the eNodeB 140. Therefore, the logical channel management unit 141 can also recognize a correspondence relationship between the virtual port and the bearer. As a result, the logical channel management unit 141 can forward a data packet that has been inputted from a virtual port to the corresponding bearer.

When the virtual port is generated, the virtual flow switch unit 142 inside the eNodeB 140 transmits a port generation notification to the control device 120 (step S204). This port generation notification includes a flow switch identifier for identifying the virtual flow switch unit 142, a port identifier assigned to the virtual port, an IP address associated with the virtual port, flow information, and APN.

On receiving the port generation notification, the control device 120 records a correspondence relationship between the communication terminal 151 and the notified port and network attribute. Furthermore, the control device 20 records a correspondence relationship between the notified port and the network attribute.

Figure 18:
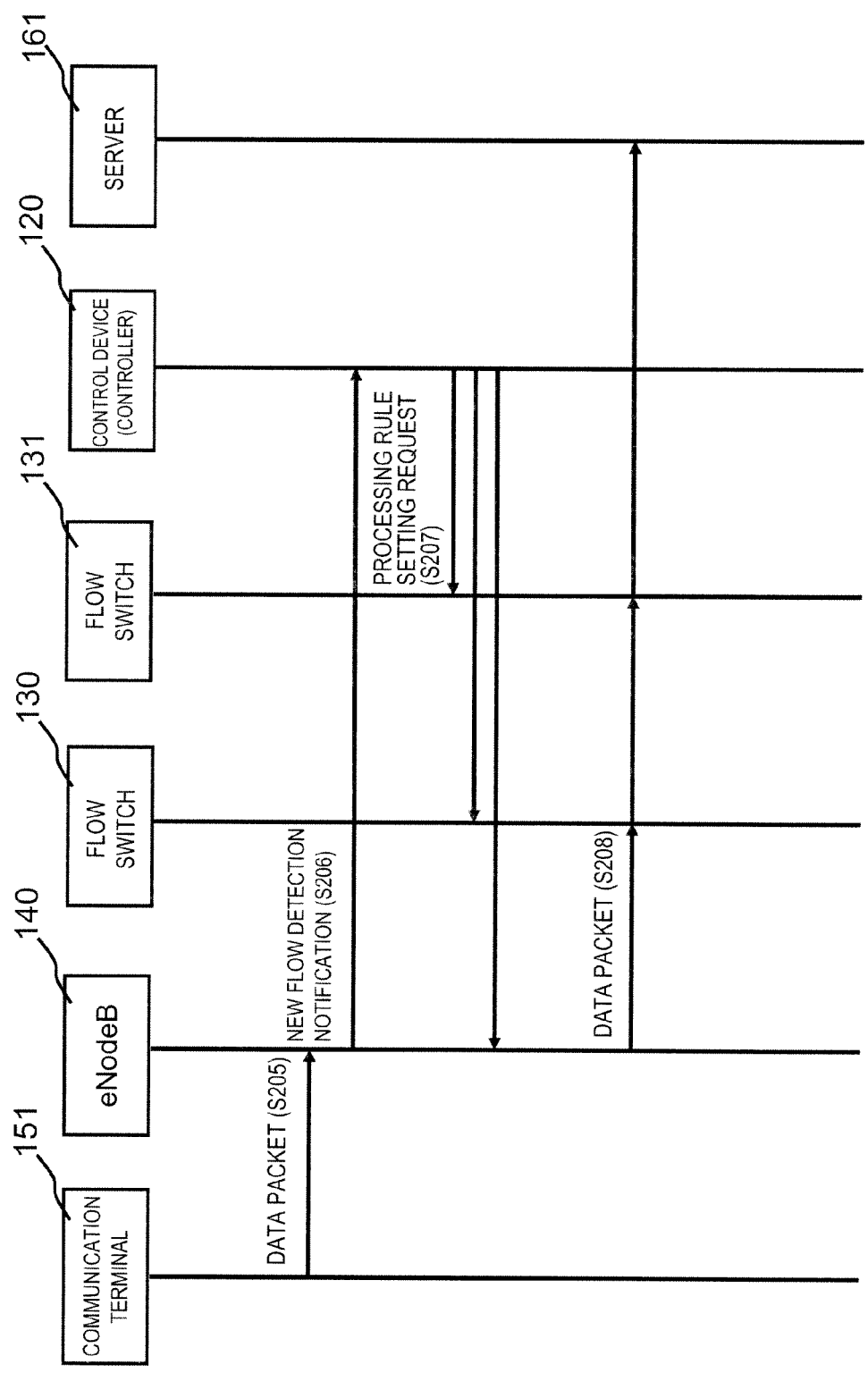
FIG. 18 is a continuation diagram of FIG. 17.

Next, using FIG. 18, a description is given of a procedure by which the communication terminal 151 starts communication with a server 161 inside the PDN 11.

First, the communication terminal 151 transmits a data packet to a destination of the server 161 (step S205). The data packet reaches the eNodeB 140 that is an end of the bearer. Here, a VLAN ID of the data packet is ID# 0.

On receiving the data packet, the eNodeB 140 transfers the data packet from the logical channel management unit 141 to the virtual flow switch unit 142, via an internal interface that corresponds to the bearer.

On receiving the data packet, the virtual flow switch unit 142 searches the flow table, and retrieves a processing rule having a matching key that matches the received packet. However, since this packet is the first packet received, a relevant processing rule does not exist.

Therefore, after buffering the received packet, the virtual flow switch unit 142 transmits a new flow detection notification to the control device 120 (step S206). This new flow detection notification includes information necessary for identifying a packet forwarding rule (for example, a MAC address, an IP address, a port number, (including source and destination of each thereof), a VLAN ID), and a receiving port identifier of the port that receives the packet.

On receiving the new flow detection notification, the control device 120 determines that this flow is a flow that belongs to the PDN 11, from a receiving port identifier included in the new flow detection notification. The control device 120 identifies that a communication partner of the communication terminal 151 is the server 161, based on information necessary for identification of a packet forwarding rule included in the new flow detection notification and information managed by the communication terminal location management function. Furthermore, the control device 120 determines a matching key of the processing rule that is newly set, and performs confirmation of the location of the server 161 that is a destination, and computes a packet forwarding path from the communication terminal 151 to the server 161. As a result of the path computation here, a forwarding path that forwards the packet in a sequence of the eNodeB 140, the flow switch 130, and the flow switch 131, is computed.

Furthermore, it is assumed that a matching key is determined with conditions whereby, in addition to the receiving port of the packet and the VLAN ID, the source IP address is the IP address of the communication terminal 151, and the destination MAC address and destination IP address are respective addresses of the server 161. In addition, a determination is made to perform an action to embed an ID# 1 in the VLAN ID by the eNodeB 140, and to embed an ID# 0, which is the original value, in the VLAN ID by the flow switch 131.

Based on the matching key and the forwarding path, the control device 120 creates processing rules, and sets a processing rule in each of the flow switches 130 and 131 that are flow switches in the path and the virtual flow switch unit 142 (step S207).

After setting the abovementioned processing rule, the control device 120 starts management of the processing rules set in the flow switches 130 and 131 and the virtual flow switch unit 142, in the processing rule management function.

When the setting of the processing rule is complete, the virtual flow switch unit 142 changes the VLAN ID of the packet, which has been buffered, to ID# 1 in accordance with the processing rule, and then forwards the packet to the flow switch 130. Since setting of the processing rules is already performed in step 5207 in the flow switches in the forwarding path of the packet, this packet is forwarded in a sequence of the flow switches 130 and 131. On receiving the packet, the flow switch 131 changes the VLAN ID of the packet to ID# 0, which is the original value, and then transmits the packet to the server 161.

Figure 19:
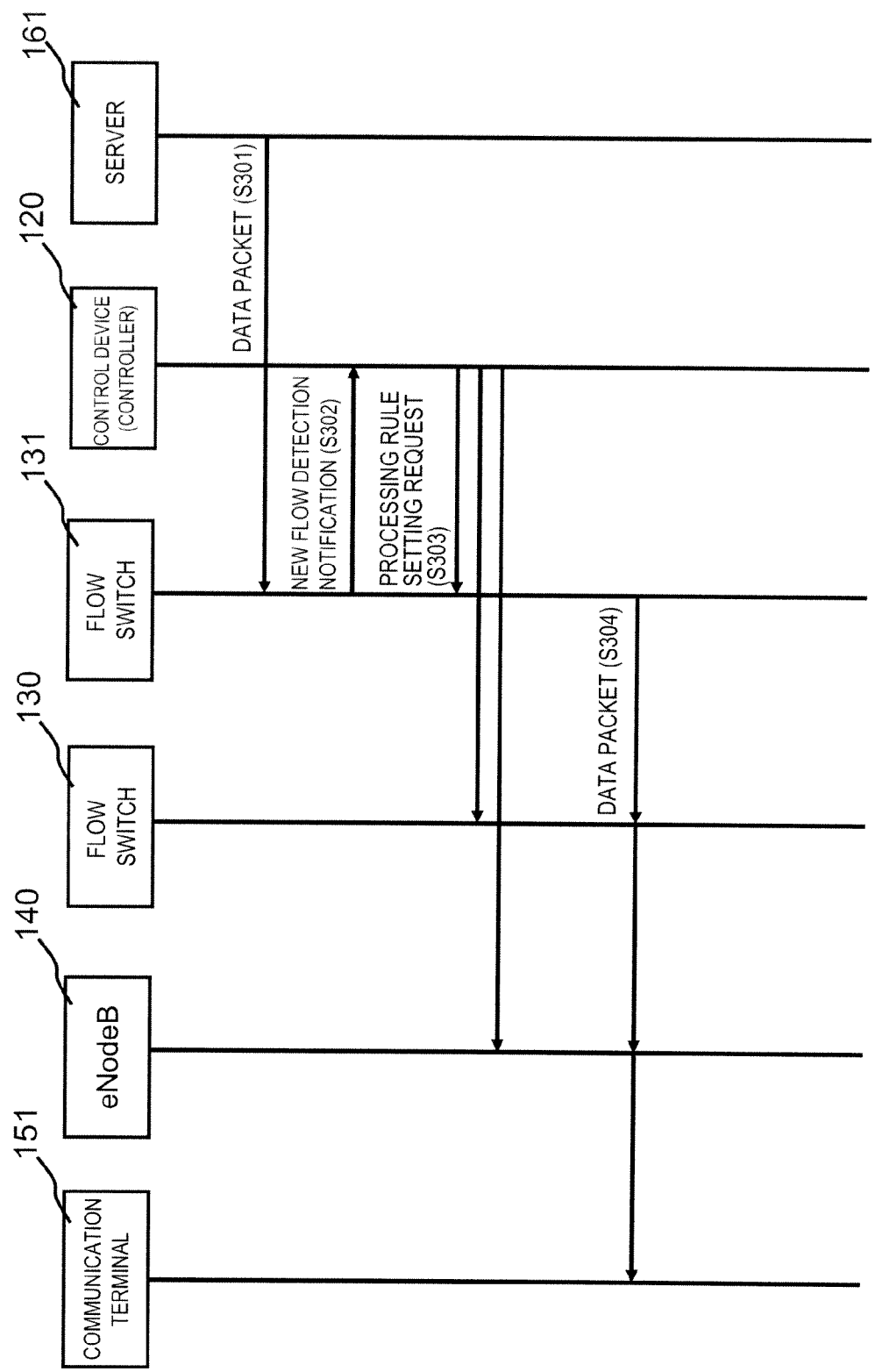
FIG. 19 is a continuation diagram of FIG. 18.

Next, using FIG. 19, a description is given of a procedure by which the server 161 inside the PDN 11 starts communication with the communication terminal 151.

First, the server 161 transmits a data packet to a destination of the communication terminal 151 (step S301). This data packet reaches the flow switch 131. Here, a VLAN ID of the data packet is ID# 0.

On receiving the data packet, the flow switch 131 searches the flow table and retrieves a processing rule having a matching key that matches the received packet. However, since this packet is the first packet transmitted by the server 161, similar to the eNodeB 140 in FIG. 18, a new flow detection notification is transmitted to the control device 120 (step S302).

On receiving the new flow detection notification, the control device 120 determines that this flow is a flow that belongs to the PDN 11, from a receiving port identifier included in the new flow detection notification. The control device 120 identifies that the destination of this packet is the communication terminal 151, based on information necessary for identification of a packet forwarding rule included in the new flow detection notification and information managed by the communication terminal location management function. Furthermore, the control device 120 determines a matching key of the processing rule that is newly set, and performs confirmation of the location of the communication terminal 151 that is the destination, and computes a packet forwarding path from the server 161 to the communication terminal 151. At this time, the control device 120 computes a forwarding path so that the flow outputs to a virtual port corresponding to a bearer established in order that the communication terminal 151 accesses the PDN 11, based on information managed by the communication terminal location management function. As a result of the path computation here, a forwarding path that forwards the packet in a sequence of the flow switch 131, the flow switch 130, and the eNodeB 140, is computed.

Furthermore, it is assumed that a matching key is determined with conditions whereby, in addition to the receiving port of the packet and the VLAN ID, the source MAC address and the source IP address are respective addresses of the server 161, and the destination IP address is an IP address of the communication terminal 151. It is to be noted that here also, a determination is made to perform an action to embed an ID# 1 in the VLAN ID by the flow switch 131, and to embed an ID# 0, which is the original value, in the VLAN ID by the eNodeB 140.

Based on the determined matching key and the forwarding path, the control device 120 creates processing rules, and sets a processing rule in the flow switches 130 and 131 and the virtual flow switch unit 142 in the forwarding path (step S303).

After setting the processing rules, the control device 120 starts management of the processing rules set in the flow switches 130 and 131 and the virtual flow switch unit 142, in the processing rule management function.

When the setting of the processing rule described above is complete, the flow switch 131 changes the VLAN ID of the packet, which has been buffered, to ID# 1 in accordance with the processing rule, and then forwards the packet to the flow switch 130 (step S304). Since setting of the processing rules is already performed in the respective nodes in the forwarding path of the packet, this packet is forwarded in a sequence of the flow switch 130 and the eNodeB 140. On receiving the packet, the eNodeB 140 changes the VLAN ID of the packet to ID# 0, which is the original value, after which the packet is made to reach the communication terminal 151 via the bearer.

Figure 20:
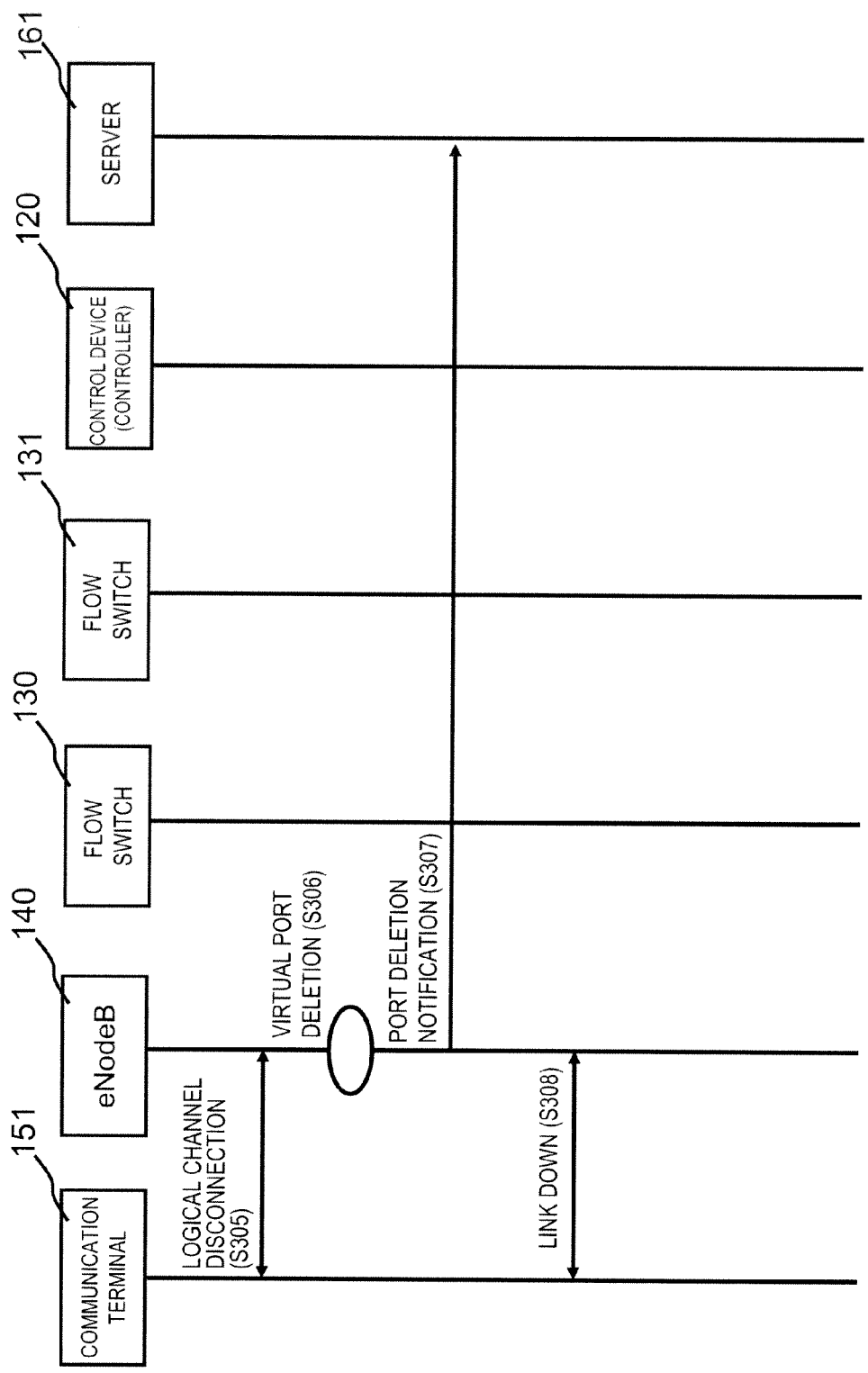
FIG. 20 is a continuation diagram of FIG. 19.

Next, using FIG. 20, a description is given of a series of steps by which the communication terminal 151 disengages from the communication system 3, that is, disconnects the bearer for accessing the PDN 11, and additionally as far as disconnecting the link with the eNodeB 140.

First, the communication terminal 151 releases the bearer for accessing the PDN 11 (step S305). When the bearer to the communication terminal 151 is released, the eNodeB 140 deletes the virtual port corresponding to this bearer (step S306). Specifically, the logical channel management unit 141 inside the eNodeB 140 gives notification of the bearer release to the virtual flow switch unit 142. On recognizing the bearer release, the virtual flow switch unit 142 deletes the virtual port associated with this bearer.

When the virtual port is deleted, the virtual flow switch unit 142 of the eNodeB 140 transmits a port deletion notification to the control device 120 (step S307). The virtual port deletion notification includes a flow switch identifier for identifying the virtual flow switch unit 142, and a port identifier assigned to the virtual port.

On receiving the port deletion notification, the control device 120 deletes the correspondence relationship between the communication terminal 151 and the notified virtual port, which is recorded by the communication terminal location management function. Furthermore, the control device 120 deletes a correspondence relationship between the notified port and a network attribute, which was recorded in the port attribute management unit.

After release of the bearer, the communication terminal 151 disconnects the link with the eNodeB 140 (step S308).

As described above, since the configuration is one of generating/deletion the virtual port that possesses a network attribute according to generation/deletion of the bearer, it is possible to identify as separate flows, resistance packets duplicated in private IP address spaces, and transmit the packets. Furthermore, since an identifier for uniquely identifying a flow within the communication system, in which a plurality of different private IP address spaces are mixed, is embedded in the data packet (the VLAN ID in the detailed embodiment), by including the identifier in a matching key in another flow switch in the path, it is possible to identify both thereof, and to generate a new processing rule (flow entry).

It is to be noted that in the above, a description has been given of establishing/releasing a bearer during a flow sequence when the communication terminal 151 is connected to the communication system 3 or disconnected, but it is also possible for the communication terminal 151 to establish/release the bearer independently of connection/disconnection to the communication system 3. Furthermore, it is also possible for the communication terminal 151 to establish two or more bearers at the same time.

As an access system, it is sufficient if a logical channel can be 1465 established, and besides LTE (Long Term Evolution), it is possible to use other access systems defined by 3GPP or 3GPP2 such as W-CDMA (Wideband Code Division Multiple Access), CDMA2000, or the like, or WiMAX (IEEE802.16e) or the like.

Figure 30:
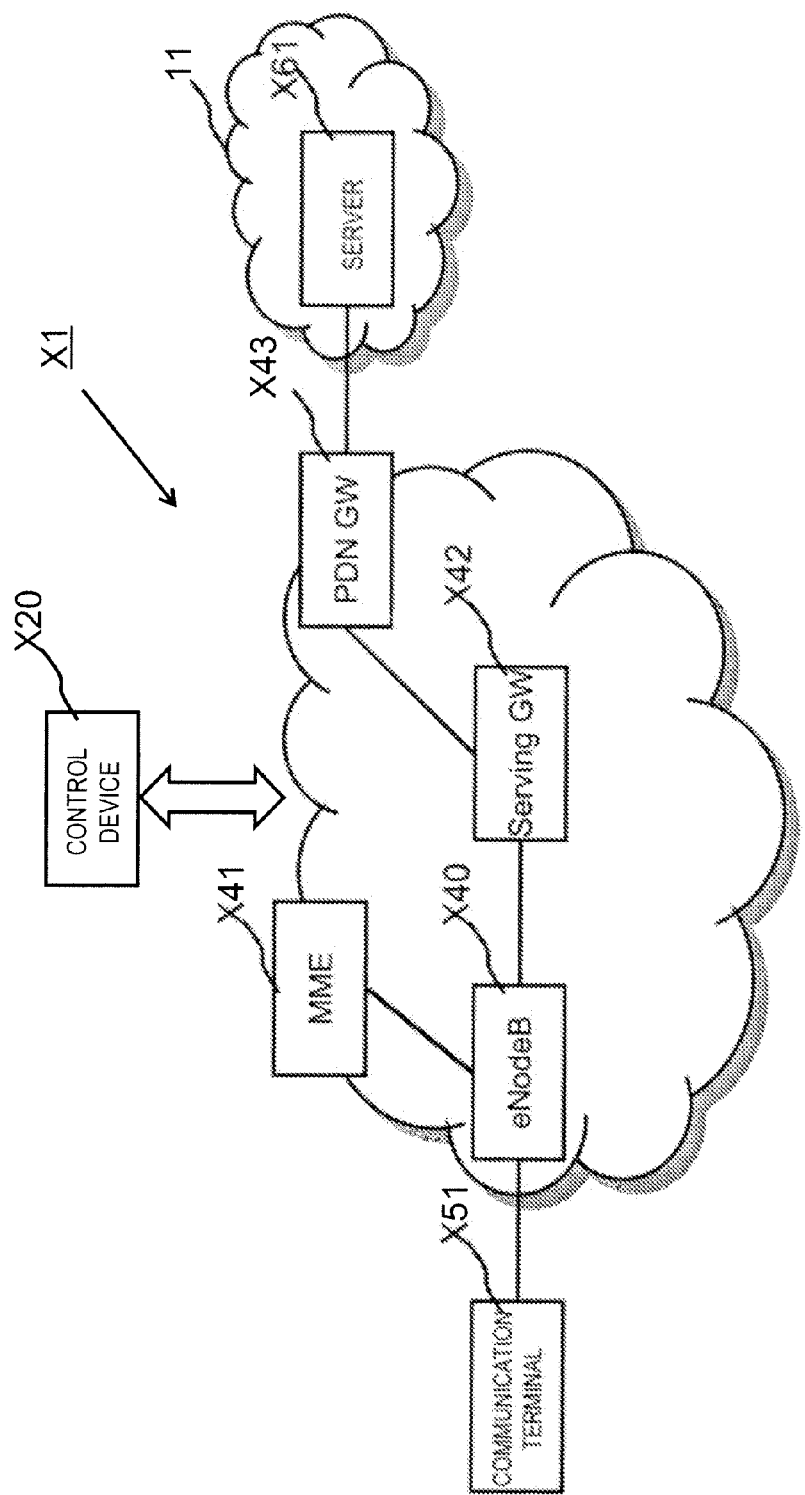
FIG. 30 is a block diagram showing a configuration of a communication system of Non-Patent Document 1.
Figure 31:
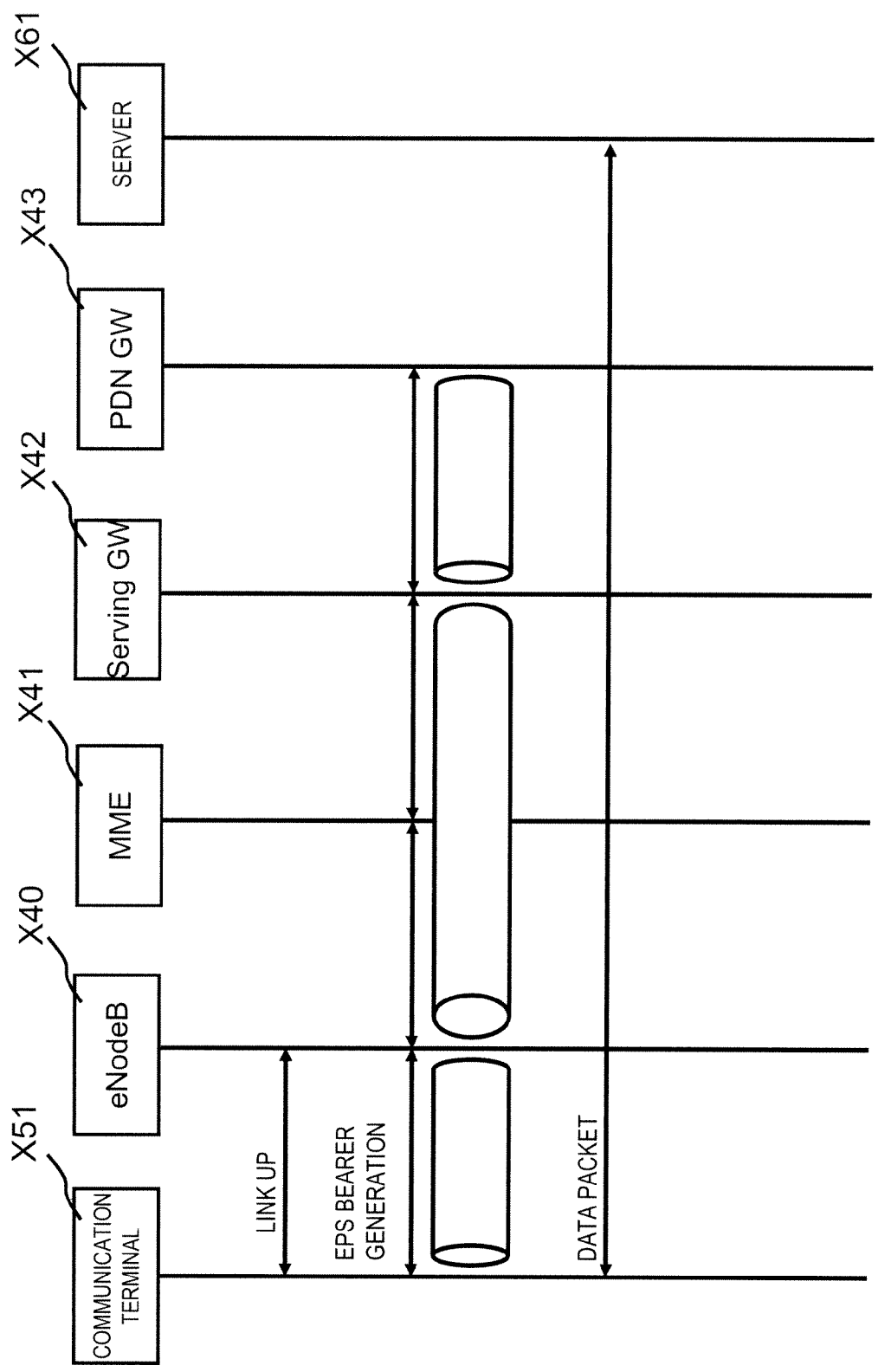
FIG. 31 is a sequence diagram showing operation of the communication system of Non-Patent Document 1.
Figure 32:
FIG. 32 is a diagram representing a flow entry configuration of Non-Patent Document 2.

Furthermore, in the abovementioned detailed embodiment, the eNodeB ends the hearer, but the bearer need not necessarily be ended by an eNodeB. For example, in a communication system where a PDN-GW exists as in FIG. 30, it is possible to employ a configuration where the PDN-GW is provided with a virtual flow switch unit.

Figure 21:
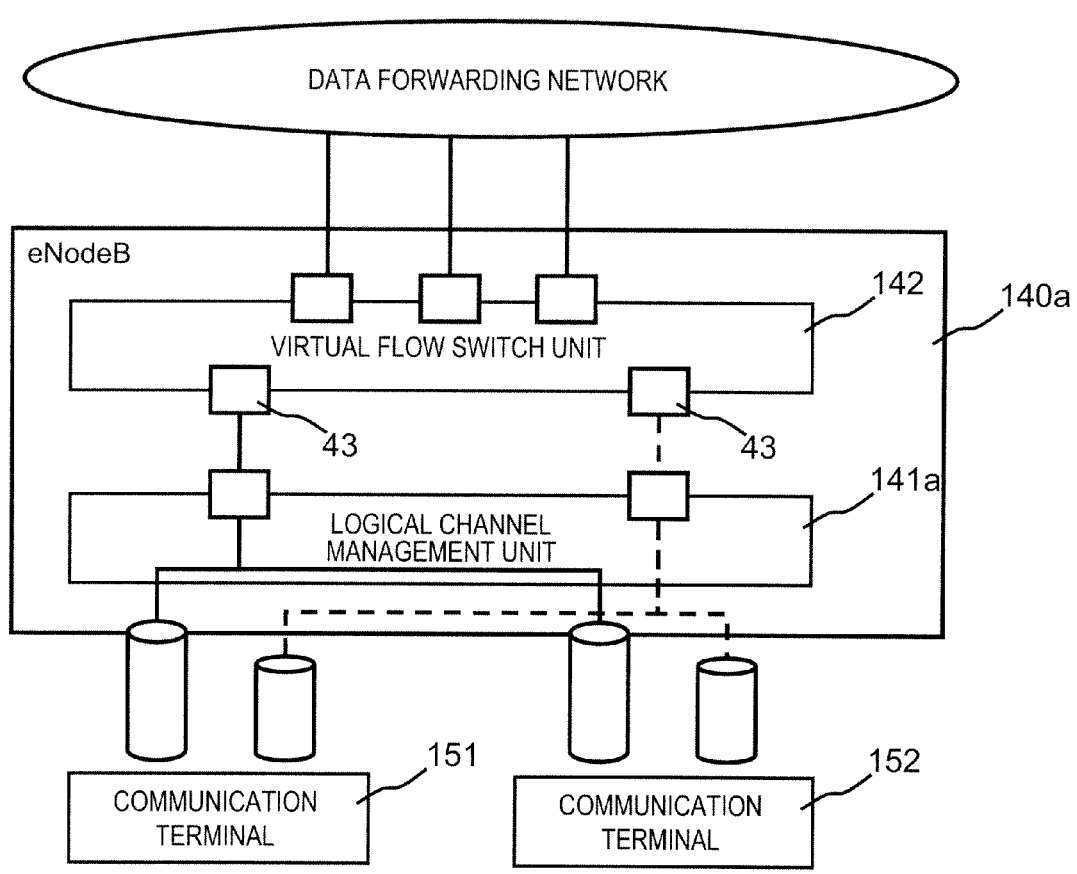
FIG. 21 is another block diagram representing a specific configuration of the eNodeB of FIG. 15.

In addition, the second exemplary embodiment can be realized by an eNodeB 140a shown in FIG. 21, and in this case, it is possible to generate/delete a virtual port by taking a plurality of bearers together in PDN units, and to generate/identify a processing rule. Furthermore, in this case, as a common parameter taking the bearers together, it is possible to use an APN notified from the communication terminal 151 or downloaded from a HSS.

It is to be noted that in the abovementioned detailed embodiment, a description was given in which the communication terminal 151 accesses the communication system 3 wirelessly, but as described below, application is also possible to a case of accessing by a wired system that can establish a logical channel as in Point-to-Point Protocol (PPP) or a Virtual Private Network (VPN).

Figure 22:
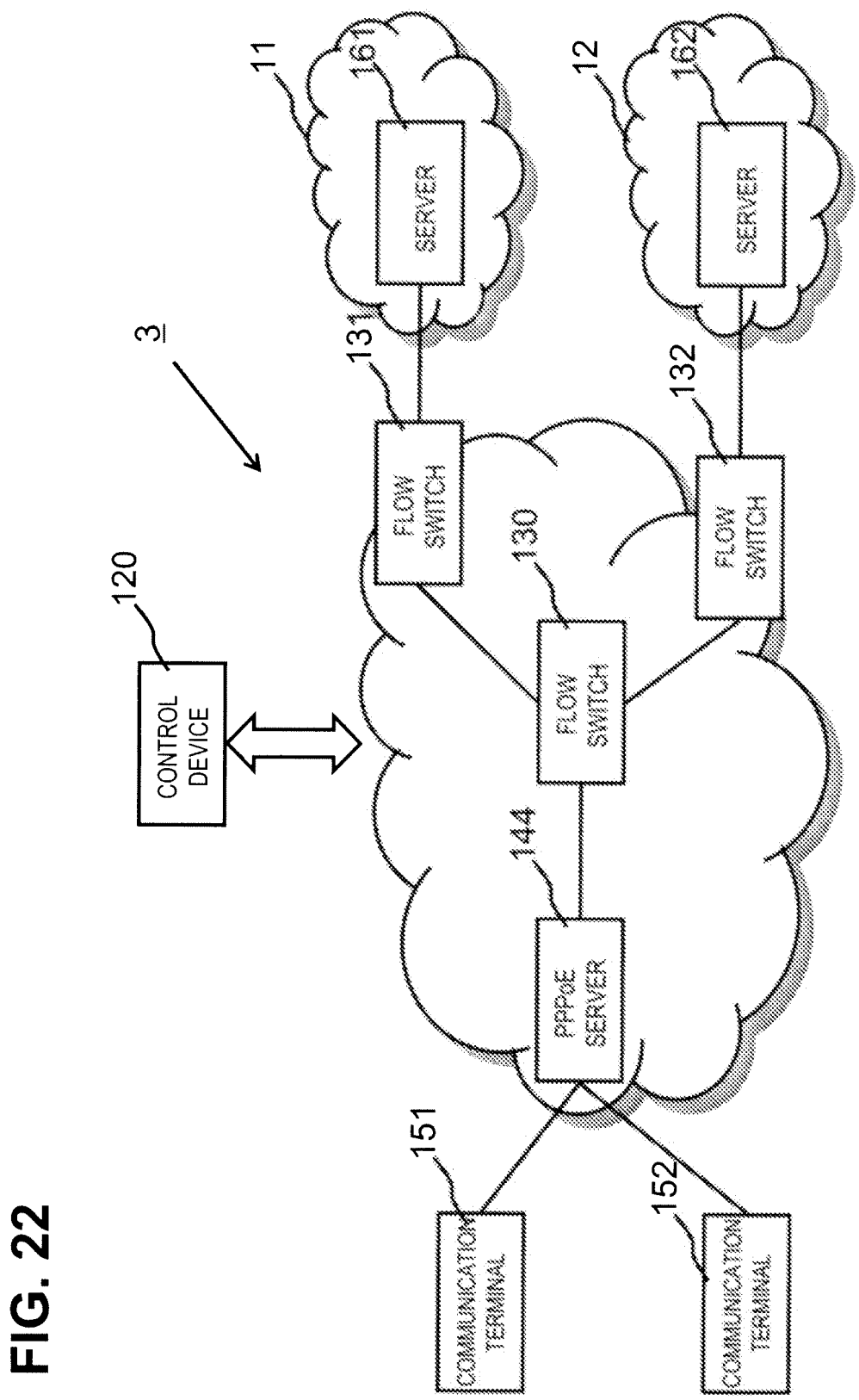
FIG. 22 is another diagram representing a configuration of a specific example of the present invention.

FIG. 22 is a diagram representing a configuration in which the present invention is applied to the PPP. In this embodiment, a PPPoE (Point-to-Point Protocol over Ethernet) server establishes a logical channel known as a PPP session with a communication terminal, and a virtual flow switch unit is provided.

Figure 23:
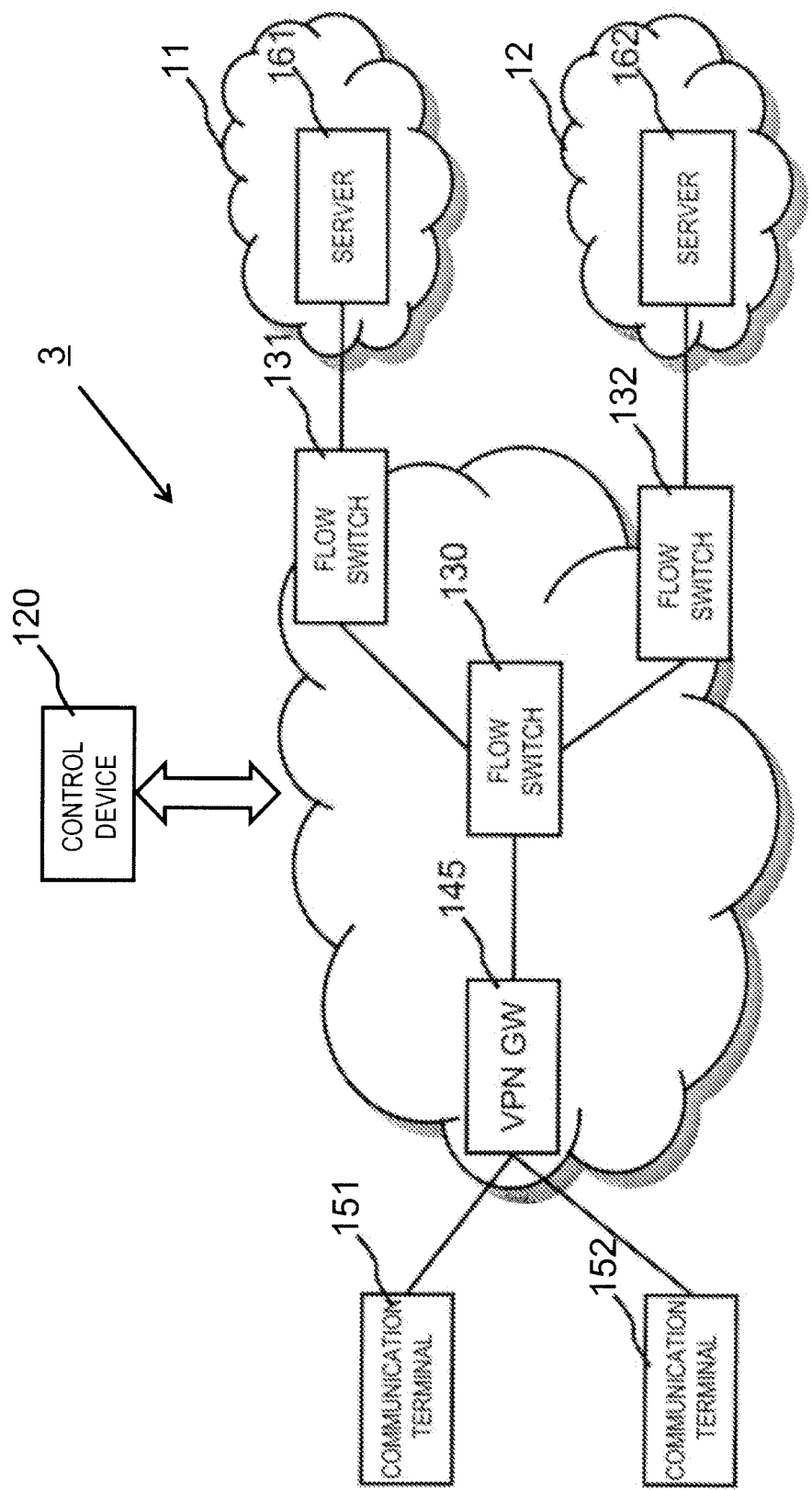
FIG. 23 is another diagram representing a configuration of a specific example of the present invention.

FIG. 23 is a diagram representing a configuration in which the present invention is applied to a VPN. In this embodiment, a Virtual Private Network Gateway (VPN GW) establishes a logical channel known as a VPN with a communication terminal, and a virtual flow switch unit is provided.

(Detailed Embodiment 2)

Figure 24:
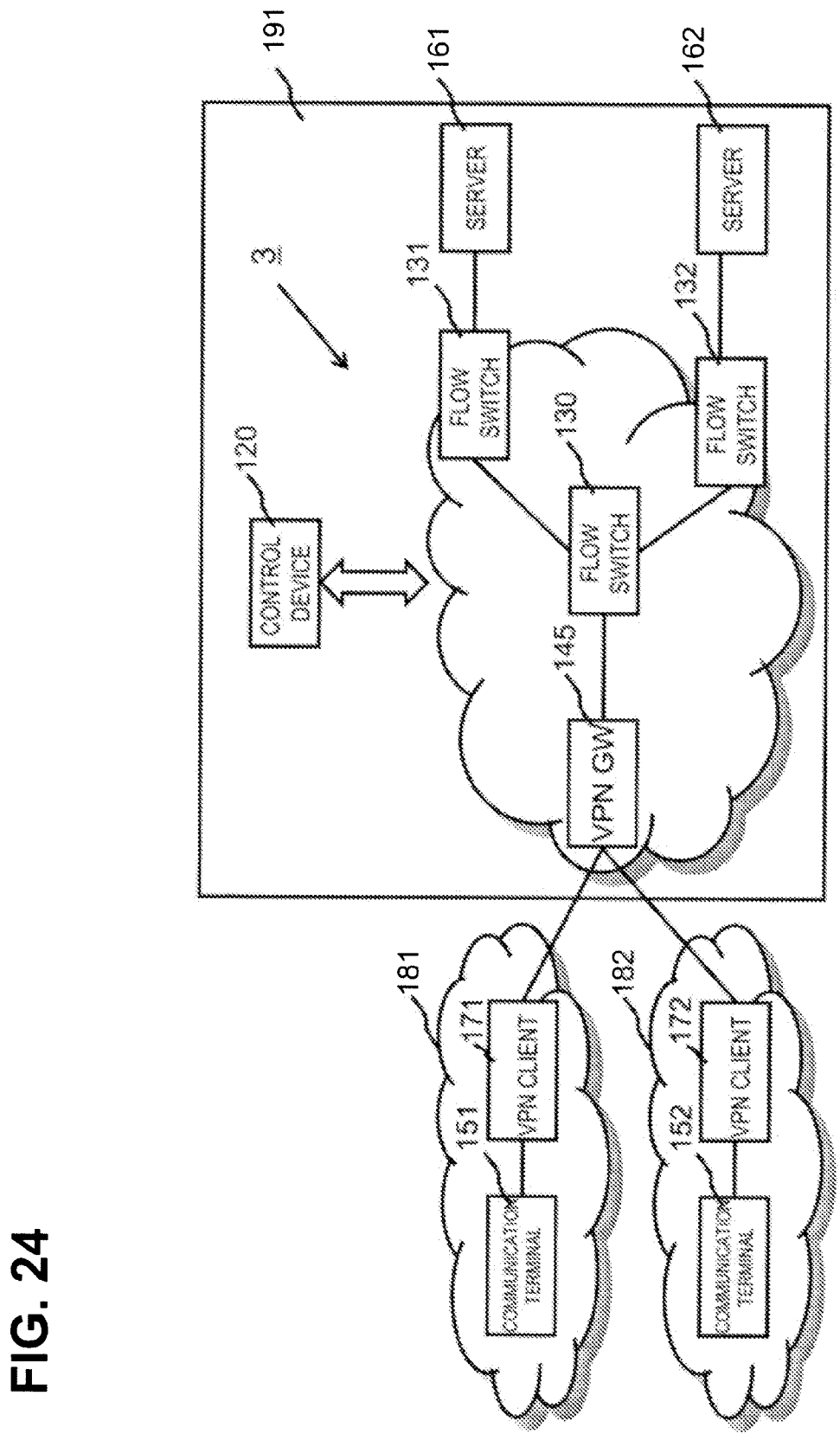
FIG. 24 is another diagram representing a configuration of a specific example of the present invention.

Next, a description is given of the first exemplary embodiment described above, by illustrating another detailed embodiment. FIG. 24 is a diagram representing a configuration of a detailed embodiment of the present invention. Referring to FIG. 24, the control device 120, the flow switches (OpenFlow switches) 130 to 132, and the VPN GW 145 are shown.

By setting a processing rule in the flow switches 130 to 132 and the VPN GW 145, the control device 120 performs path control so that a terminal connected to the communication system 3 performs communication. More specifically, a network topology management function, a communication terminal location management function, a processing rule generation function, a path computation function, a processing rule management function, a flow switch management function, and a port attribute management function are provided. This type of control device 120 can be configured based on, for example, an OpenFlow controller of Non-Patent Document 2. Since the control device 120 is the same as the control device 120 described in detailed embodiment 1, a detailed description of each function is omitted.

The flow switches 130 to 132 correspond to forwarding nodes 30 to 32 of the first exemplary embodiment described above, and are devices that perform packet forwarding, based on a processing rule set by the control device 120. These flow switches 130 to 132 can be configured, for example, by an OpenFlow switch of Non-Patent Document 2.

The VPN GW 145 corresponds to the logical channel control device 40 of the first exemplary embodiment described above, and is realized by a VPN device or the like that manages a logical channel for a communication terminal belonging to an enterprise network to connect to a data center network, and provides connectivity to the communication system 3.

Figure 25:
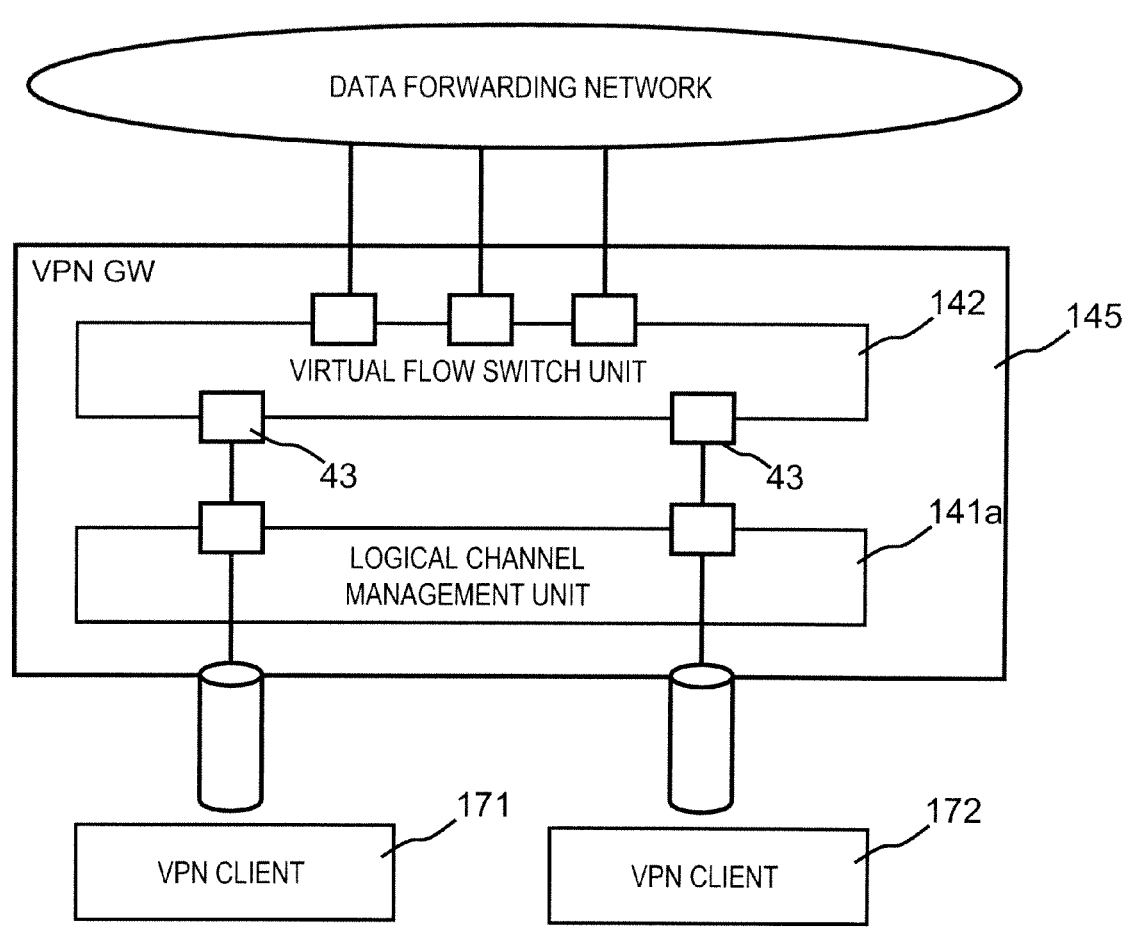
FIG. 25 is another block diagram representing a specific configuration of a VPN GW of FIG. 24.

FIG. 25 is a block diagram representing a specific configuration of the VPN GW 145 of FIG. 24. As shown in FIG. 25, the VPN GW 145 is provided with a logical channel management unit 141a and a virtual flow switch unit 142.

The logical channel management unit 141a is provided with a VPN tunnel management function of generating and releasing a VPN tunnel established between a VPN client and the VPN GW 145 for the communication terminal inside the enterprise network to communicate with a server inside the data center network 191, a VPN tunnel event notification function of giving notification of an event such as generation or release of the VPN tunnel to the virtual flow switch unit 142, and a packet forwarding function between the VPN tunnel and the virtual flow switch unit 142.

The virtual flow switch unit 142 is provided with a virtual port management function and a port event notification function, in addition to functions corresponding to the flow switches 130 to 132 described above. The virtual port management function is a function that performs generation/deletion of virtual ports corresponding to respective VPN tunnels, in response to an event of generating/releasing a VPN tunnel notified by the logical channel management unit 141, the function also performing virtual port management. The port event notification function is a function that gives notification of an event of generation/deletion a port corresponding o a virtual port, to the control device 120.

It is to be noted that in the present detailed embodiment, the communication terminal 151 and the VPN client 171 that exist inside the enterprise network 181, and the server 161 that exists inside the data center network 191 are devices belonging to the enterprise network 181. In the same way, the communication terminal 152 and the VPN client 172 that exist inside the enterprise network 182, and the server 162 that exists inside the data center network 191 are devices belonging to the enterprise network 182.

Furthermore, in the detailed embodiment, only one of each of the communication terminal and the VPN client are described in each of the enterprise networks 181 and 182, but there may be a plurality of each thereof. In addition, in the present detailed embodiment, the VPN client can be provided with connectivity from the VPN GW 145 as an external node.

Next, a detailed description is given concerning overall operation, making reference to sequence diagrams of FIG. 26 to FIG. 29.

Figure 26:
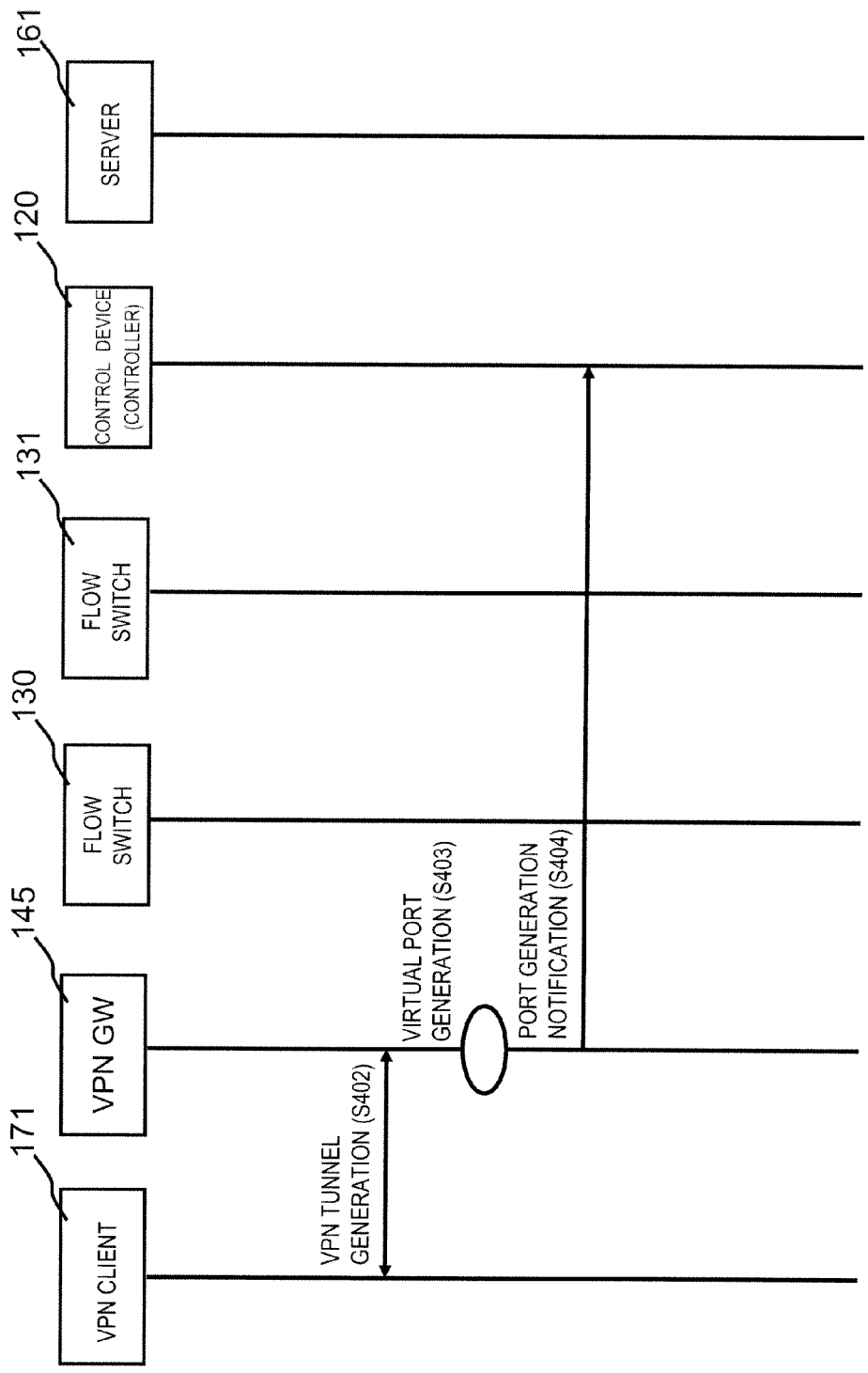
FIG. 26 is a sequence diagram showing operation of a specific example of the present invention.

First, using FIG. 26, a description is given of a series of steps by which the VPN client 171 connects to the data center network 191, that is, as far as generating a VPN tunnel with the VPN GW 145.

First, the VPN client 171 generates the VPN tunnel to the VPN GW 145, in order to access the data center network 191 (step S402). When the VPN tunnel is generated, by giving notification of flow information passing through the VPN tunnel together with network attribute information showing the enterprise network 181, the VPN client 171 explicitly notifies the VPN GW 145 that the VPN tunnel is a VPN tunnel for accessing a server inside the data center network 191, belonging to the enterprise network 181.

It is to he noted that in the example of FIG. 26, notification of network identification information and flow information belonging to the VPN tunnel is given by the VPN client 171 to the VPN GW 145, but a configuration is also possible where downloading is performed from a cooperating authentication server (not illustrated in the drawings) at a time of VPN tunnel establishment.

When the VPN tunnel to the VPN client 171 is generated, the VPN GW 145 generates a virtual port corresponding to the VPN tunnel (step S403).

Specifically, the logical channel management unit 141a that is a function inside the VPN GW 145 gives notification of the VPN tunnel generation to the virtual flow switch unit 142. At this time, the logical channel management unit 41 also gives notification of network attribute information belonging to the VPN client 171 associated with the VPN tunnel. On recognizing generation of the new VPN tunnel, the virtual flow switch unit 142 generates a virtual port associated with this VPN tunnel. The virtual port is connected to the logical channel management unit 141 a by an internal interface of the VPN GW 145. Therefore, the logical channel management unit 141a can also recognize a correspondence relationship between the VPN tunnel and the virtual port. As a result, the logical channel management unit 141a can forward a data packet that has been inputted by the virtual port to a corresponding VPN tunnel.

When the virtual port is generated, the virtual flow switch unit 142 inside the VPN GW 145 transmits a port generation notification to the control device 120 (step S404). This port generation notification includes a flow switch identifier for identifying the virtual flow switch unit 142, a port identifier assigned to the virtual port, and network identification information associated with the virtual port.

On receiving the port generation notification, the control device 120 records a correspondence relationship between the notified virtual port and a network attribute thereof.

Figure 27:
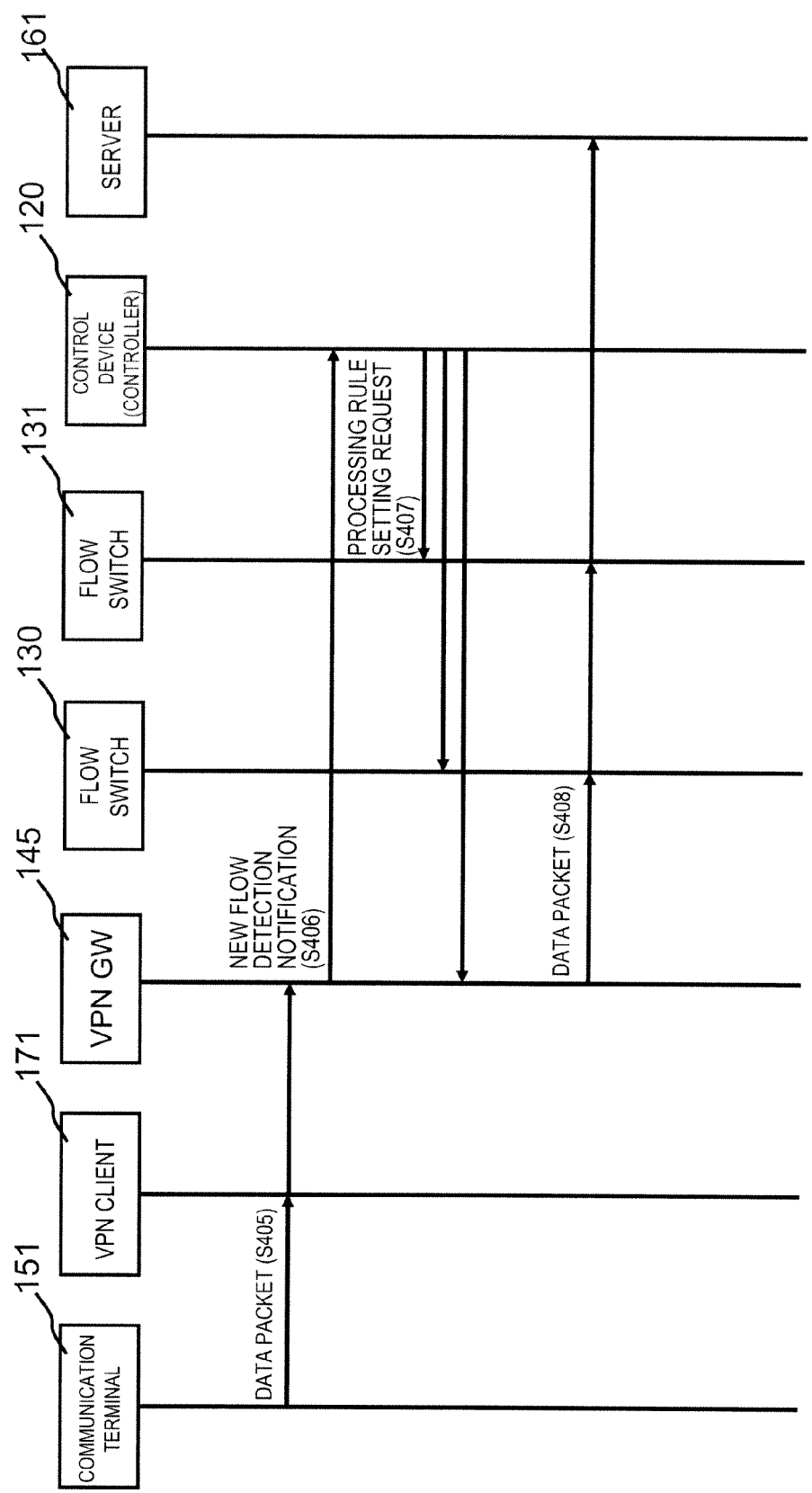
FIG. 27 is a continuation diagram of FIG. 26.

Next, using FIG. 27, a description is given of a procedure by which the communication terminal 151 starts communication with a server 161 inside the data center network 191.

First, the communication terminal 151 transmits a data packet to a destination of the server 161 via the VPN tunnel (step S405). The data packet reaches the VPN GW 145 that is an end the VPN tunnel. Here, a VLAN ID of the data packet is assumed to be ID# 0.

On receiving the data packet, the VPN GW 145 transfers the data packet from the logical channel management unit 141 a to the virtual flow switch unit 142, via an internal interface that corresponds to the VPN tunnel.

On receiving the data packet, the virtual flow switch unit 142 searches a flow table, and retrieves a processing rule having a matching key that matches the received packet. However, since this packet is the first packet received, a relevant processing rule does not exist.

Therefore, after buffering the received packet, the virtual flow switch unit 142 transmits a new flow detection notification to the control device 120 (step S406). This new flow detection notification includes information necessary for identifying a packet forwarding rule (for example, a MAC address, an IP address, a port number, (including source and destination of each thereof), a VLAN ID), and a receiving port identifier of the port that receives the packet.

On receiving the new flow detection notification, the control device 120 records that the communication terminal 151 exists in the receiving port included in the new flow detection notification in a database in a communication terminal location management function. Next, the control device 120 determines that this flow is a flow that belongs to the enterprise network 181, from the receiving port identifier included in the new flow detection notification. The control device 120 identifies that a communication partner of the communication terminal 151 is the server 161, based on information necessary for identification of a packet forwarding rule included in the new flow detection notification and information managed by the communication terminal location management function. Furthermore, the control device 120 determines a matching key of the processing rule that is newly set, and performs confirmation of the location of the server 161 that is a destination, and computes a packet forwarding path from the communication terminal 151 to the server 161. As a result of the path computation here, a packet forwarding path is assumed to be computed in which the packet is forwarded in a sequence of the VPN GW 145, the flow switch 130, and the flow switch 131.

Furthermore, it is assumed that a matching key is determined with conditions whereby, in addition to the receiving port of the packet and the VLAN ID, the source IP address is the IP address of the communication terminal 151, and the destination MAC address and destination IP address are respective addresses of the server 161. In addition, a determination is made to perform an action embedding an ID# 1 in the VLAN ID by the VPN GW 145, and embedding an ID# 0, which is the original value, in the VLAN ID by the flow switch 131.

Based on the matching key and the forwarding path, the control device 120 creates processing rules, and sets a processing rule in each of the flow switches 130 and 131 that are flow switches in the path, and the virtual flow switch unit 142 (step S407).

After setting the abovementioned processing rules, the control device 120 starts management of the processing rule set in the flow switches 130 and 131 and the virtual flow switch unit 142, in the processing rule management function.

When the setting of the processing rules is complete, the virtual flow switch unit 142 changes the VLAN ID of the packet, which has been buffered, to ID# 1, and then forwards the packet to the flow switch 130, in accordance with the processing rule (step S408). Since setting of the processing rules is already performed in step S407 in the flow switches in the forwarding path of the packet, this packet is forwarded in a sequence of the flow switches 130 and 131. On receiving the packet, the flow switch 131 changes the VLAN ID of the packet to ID# 0, which is the original value, and then transmits the packet to the server 161.

Figure 28:
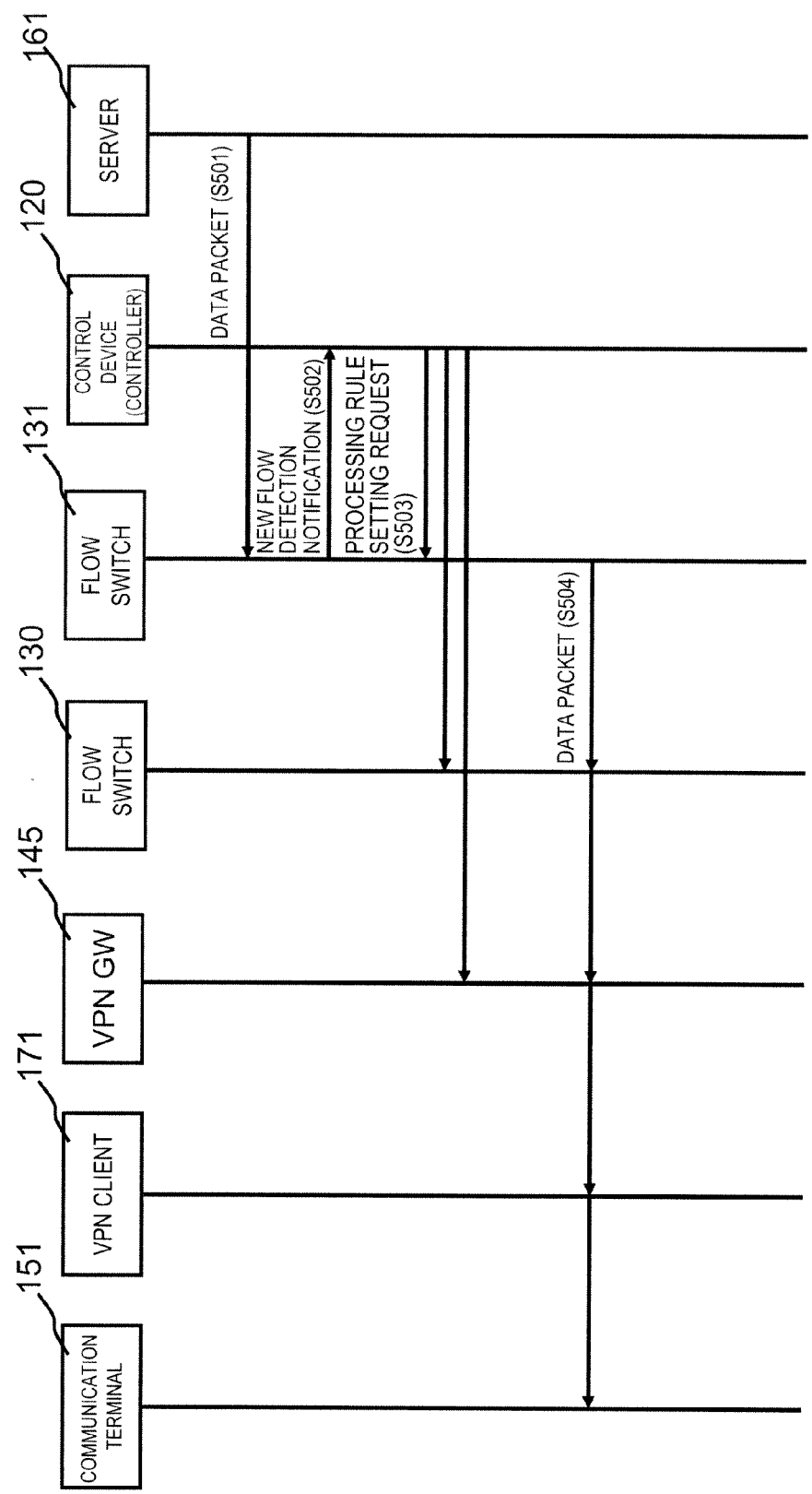
FIG. 28 is a continuation diagram of FIG. 27.

Next, using FIG. 28, a description is given of a procedure in which the server 161 inside the data center network 191 starts communication with the communication terminal 151.

First, the server 161 transmits a data packet to a destination of the communication terminal 151 (step S501). This data packet reaches the flow switch 131. Here, a VLAN ID of the data packet is assumed to be ID# 0.

On receiving the data packet, the flow switch 131 searches the flow table and retrieves a processing rule having a matching key that matches the received packet. However, since this packet is the first packet transmitted by the server 161, similar to the VPN GW 145 in FIG. 27, a new flow detection notification is transmitted to the control device 120 (step S502).

On receiving the new flow detection notification, the control device 120 determines that the flow is a flow that belongs to the enterprise network 181, from a receiving port identifier included in the new flow detection notification. The control device 120 identifies that the destination of this packet is the communication terminal 151, based on information necessary for identification of a packet forwarding rule included in the new flow detection notification and information managed by the communication terminal location management function. Furthermore, the control device 120 determines a matching key of the processing rule that is newly set, and performs confirmation of the location of the communication terminal 151 that is the destination, and computes a packet forwarding path from the server 161 to the communication terminal 151. At this time, the control device 120 computes a forwarding path so that the flow outputs to a virtual port corresponding to the VPN tunnel established in order that the communication terminal 151 accesses the PDN 11, based on information managed by the communication terminal location management function. As a result of the path computation here, a forwarding path that forwards the packet in a sequence of the flow switch 131, the flow switch 130, and the VPN GW 145, is assumed.

Furthermore, it is assumed that a matching key is determined with conditions whereby, in addition to the receiving port of the packet and the VLAN ID, the source MAC address and the source IP address are respective addresses of the server 161, and the destination IP address is an IP address of the communication terminal 151. It is to be noted that here also, a determination is made to perform an action embedding an ID# 1 in the VLAN ID by the VPN GW 145, and embedding an ID# 0, which is the original value, in the VLAN ID by the flow switch 131.

Based on the determined matching key and the forwarding path, the control device 120 creates processing rules, and sets processing rules in the flow switches 130 and 131 and the virtual flow switch unit 142 in the forwarding path (step S503).

After setting e processing rules, the control device 120 starts management of the processing rules set in the flow switches 130 and 131 and the virtual flow switch unit 142, in the processing rule management function.

When the setting of the processing rules described above is complete, the flow switch 131 changes the VLAN ID of the packet, which has been buffered, to ID# 1 in accordance with the processing rule, and then forwards the packet to the flow switch 130 (step S504). Since setting of the processing rules is already performed in the respective nodes in the forwarding path of the packet, this packet is forwarded in a sequence of the flow switch 130 and the VPN GW 145. On receiving the packet, the VPN GW 145 changes the VLAN ID of the packet to ID# 0, which is the original value, and then transmits the packet to the communication terminal 151 through the VPN tunnel.

Figure 29:
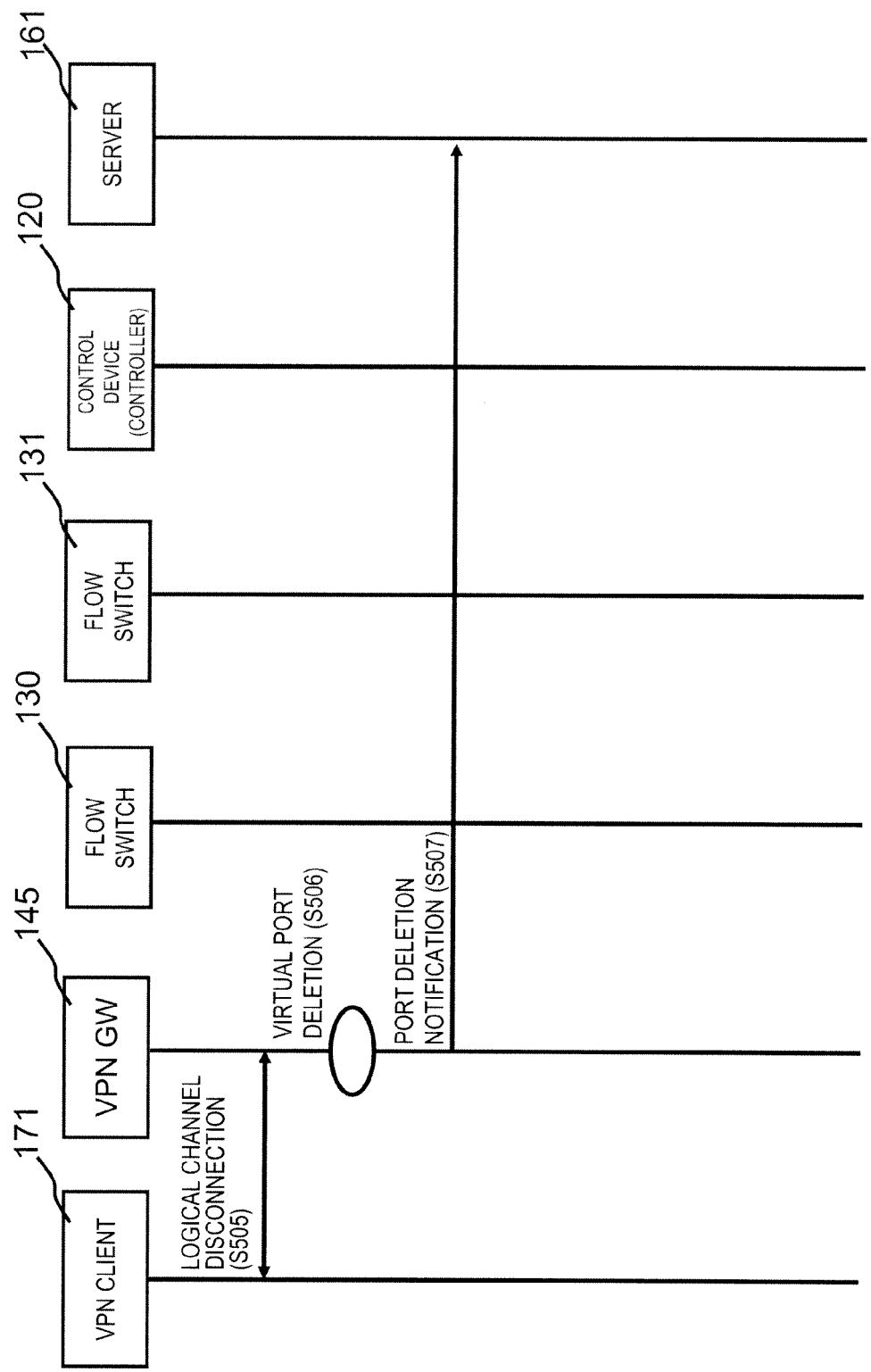
FIG. 29 is a continuation diagram of FIG. 28.

Next, using FIG. 29, a description is given of a series of steps as far as where the VPN client 171 disengages from the communication system 3, that is, disconnects the VPN tunnel for accessing the data center network 191.

First, the VPN client 171 releases the VPN tunnel for accessing the data center network 191 (step S505). When the VPN client 171 and the VPN tunnel are released, the VPN GW 145 deletes the virtual port corresponding to the VPN tunnel (step S506). Specifically, the logical channel management unit 141*a* that is inside the VPN GW 145 gives notification of the VPN tunnel release to the virtual flow switch unit 142. On recognizing the VPN tunnel release, the virtual flow switch unit 142 deletes the virtual port associated with this VPN tunnel.

When the virtual port is deleted, the virtual flow switch unit 142 of the VPN GW 145 transmits a port deletion notification to the control device 120 (step S507). This port deletion notification includes a flow switch identifier for identifying the virtual flow switch unit 142, and a port identifier assigned to the virtual port.

On receiving the port deletion notification, the control device 120 deletes a correspondence relationship between the notified port and a network attribute, which was recorded in the port attribute management unit. Furthermore, if there exists a communication terminal recorded in the communication terminal location management function connected to the notified port, the control device 120 deletes the correspondence relationship between the communication terminal and notified virtual port.

As described above, since the configuration is one of generating/deleting the virtual port that possesses a network attribute according to generation/removal of the VPN tunnel, it is possible to identify, as separate flows, respective packets duplicated in private IP address spaces, and to transmit the packets. Furthermore, since an identifier for uniquely identifying a flow within the data center network in which a plurality of different private IP address spaces are mixed is embedded in the data packet (the VLAN ID in the detailed embodiment), by including the identifier in a matching key in another flow switch in the path, it is possible to identify both thereof, and to generate a new processing rule (flow entry).

It is to be noted that in the abovementioned description, in order to simplify the description, a description was given by assuming that the data center network 191 is configured to be enclosed inside one space, as in FIG. 24, but if one data center network is logically formed, individual devices may be scattered in a plurality of geographically different spaces.

Descriptions have been given above according to the exemplary embodiments and detailed embodiments of the present invention, but the present invention is not limited to the abovementioned exemplary embodiments, and further modifications, substitutions and adjustments can be added within a scope that does not depart from fundamental technological concepts of the invention.

Finally, preferred modes of the present invention are summarized.

(First Mode)
(Refer to the communication system according to the first aspect described above.)

(Second Mode)
In the communication system according to the first mode, the forwarding node that operates as the logical channel control device gives a notification of creation or deletion of the virtual port with network attribute information of the logical channel, to the control device, and the control device computes a forwarding path of a packet based on the notified network attribute information.

(Third Mode)
In the communication system according to the second mode, the control device causes a first forwarding node in the computed packet forwarding path to execute processing of embedding in a packet an identifier based on the network attribute information, and causes a final forwarding node in the packet forwarding path to execute processing of removing the identifier from the packet.

(Fourth Mode)
In the communication system according to any one of the first to third modes, the forwarding node that operates as the logical channel control device associates a plurality of logical channels having a common parameter, with one virtual port, to perform management.

(Fifth Mode)
In the communication system according to the fourth mode, network attribute information of the logical channels is used as the common parameter.

(Sixth Mode)
(Refer to the logical channel control device according to the second aspect described above)

(Seventh Mode)
In the logical channel control device according to the sixth mode, a notification of creation or deletion of the virtual port and also a notification of network attribute information of the logical channel are given to the control device.

(Eighth Mode)
In the logical channel control device according to the sixth or seventh mode, a plurality of logical channels having a common parameter are associated with one virtual port to be managed.

(Ninth Mode)
In the logical channel control device according to the seventh mode, network attribute information of the logical channels is used as the common parameter.

(Tenth Mode)
(Refer to the control device according to the third aspect described above.)

(Eleventh Mode)
The control device according to the tenth mode, causes a first forwarding node in the computed packet forwarding path to execute processing of embedding in a packet an identifier based on the network attribute information, and causes a final forwarding node in the packet forwarding path to execute processing of removing the identifier from the packet.

(Twelfth Mode)
(Refer to the communication method according to the fourth aspect described above.)

(Thirteenth Mode)
(Refer to the program according to the fifth aspect described above.)

It is to be noted that that the twelfth and thirteenth modes described above, similarly to the first mode described above, can be expanded with regard to the second to the fifth modes.

Modifications and adjustments of the exemplary embodiments are possible within the bounds of the entire disclosure (including the scope of the claims) of the present invention, and also based on fundamental technological concepts thereof. Furthermore, a wide variety of combinations and selections of various disclosed elements is possible within the scope of the claims of the present invention. That is, the present invention clearly includes every type of transformation and modification that a person skilled in the art can realize according to the entire disclosure including the scope of the claims and to technological concepts thereof.

INDUSTRIAL APPLICABILITY

The present invention can be applied to a mobile backhaul system forming a mobile access network containing a plurality of base stations.

EXPLANATION OF SYMBOLS 1, 3 communication system
11, 12 Packet Data Network (PDN)
20 control device
21 flow entry data base (flow entry DB)
22 communication terminal location management unit
23 topology management unit
24 path/action computation unit
25 flow entry management unit
26 control message processing unit
27 node communication unit
28 port attribute management unit
30 to 32 forwarding node
40, 40a logical channel control device
41, 41a, 141, 141a logical channel management unit
42, 142 virtual flow switch unit
43 virtual port
51, 52, 151, 152 communication terminal
61, 62, 161, 162 server
130, 131, 132 flow switch
144 Point to Point Protocol over Ethernet (PPPoE) server
145 Virtual Private Network Gateway (VPN GW)
171, 172 Virtual Private Network (VPN) client
181, 182 enterprise network
191 data center network
X1 communication system
X20, 120 control device
X40, 140, 140a E-UTRAN Node-B (eNodeB)
X41, 241 Mobility Management Entity (MME)
X42 Serving Gateway (Serving GW)
X43 Packet Data Network Gateway (PDN GW)
X51 communication terminal
X61 server

The invention claimed is:

1. A communication system comprising:
a control device that sets a processing rule in a forwarding node; and
a plurality of forwarding nodes provided with a packet processing device that performs processing of a received packet based on said set processing rule,
wherein at least one forwarding node among said forwarding nodes operates as a logical channel control device that establishes a logical channel to an external node having a private address, generates a virtual port associated with said logical channel established to said external node, and gives notification thereof to said control device, the notification including a correspondence between the virtual port and a network to which the external node belongs,
wherein said control device establishes, according to the notified correspondence between the virtual port and the network, a forwarding path corresponding to the logical channel established between the external node and a user terminal device,
wherein the logical channel control device comprises:
a logical channel management device that establishes the logical channel to the external node having a private address, and generates the virtual port associated with the logical channel; and a virtual flow switch device that performs processing of a received packet based on the processing rule set by the control device and gives notification of creation of the virtual port to the control device, and wherein the logical channel management device includes a table which stores a logical channel number, a network attribute, flow information, and an internal interface (IF) number.

2. The communication system according to claim 1, wherein said forwarding node that operates as said logical channel control device gives a notification of creation or deletion of said virtual port with network attribute information of said logical channel, to said control device, and said control device computes a forwarding path of a packet based on said notified network attribute information.

3. The communication system according to claim 2, wherein said control device causes a first forwarding node in said computed packet forwarding path to execute processing of embedding in a packet an identifier based on said network attribute information, and causes a final forwarding node in said packet forwarding path to execute processing of removing said identifier from said packet.

4. The communication system according to of claim 3, wherein said forwarding node that operates as said logical channel control device associates a plurality of logical channels having a common parameter, with one virtual port, and manages said virtual port.

5. The communication system according to claim 4, wherein network attribute information of said logical channels is used as said common parameter.

6. The communication system according to of claim 2, wherein said forwarding node that operates as said logical channel control device associates a plurality of logical channels having a common parameter, with one virtual port, and manages said virtual port.

7. The communication system according to claim 6, wherein network attribute information of said logical channels is used as said common parameter.

8. The communication system according to claim 1, wherein said forwarding node that operates as said logical channel control device associates a plurality of logical channels having a common parameter, with one virtual port, and manages said virtual port.

9. The communication system according to claim 8, wherein network attribute information of said logical channels is used as said common parameter.

10. The communication system according to claim 1, wherein the control device comprises:

a communication terminal location management device that manages a network to which a communication terminal and a packet data network belong, and manages a port of the logical channel control device and forwarding nodes to which the communication terminal and the packet data network are connected.

11. The communication system according to claim 10, wherein the communication terminal location management device includes a table which stores information on the communication terminal and the packet data network, including terminal identification information, location information, network attribute information, and flow information.

12. The communication system according to claim 1, wherein the control device further comprises:

a port attribute management device which manages port attribute information, and includes a table which stores switch numbers, port numbers, and network attributes.

13. The communication system according to claim 1, wherein the control device controls the plurality of forwarding nodes.

14. The communication system according to claim 1, wherein the control device and the plurality of forwarding nodes other than the at least one forwarding node that operates as a logical channel control device, form a data forwarding network.

15. The communication system according to claim 1, wherein the control device comprises:

a node communication device that performs communication with the plurality of forwarding nodes and the logical channel control device.

16. A communication system comprising:

a control device that sets a processing rule in a forwarding node; and a plurality of forwarding nodes provided with a packet processing device that performs processing of a received racket based on said set processing rule, wherein at least one forwarding node among said forwarding nodes operates as a logical channel control device that establishes a logical channel to an external node having a private address generates a virtual sort associated with said logical channel established to said external node, and gives notification thereof to said control device, the notification including a correspondence between the virtual port and a network to which the external node belongs, wherein said control device establishes, according to the notified correspondence between the virtual port and the network, a forwarding path corresponding to the logical channel established between the external node and a user terminal device, wherein the logical channel control device comprises:

a logical channel management device that establishes the logical channel to the external node having a private address, and generates the virtual port associated with the logical channel; and a virtual flow switch device that performs processing of a received packet based on the processing rule set by the control device and gives notification of creation of the virtual port to the control device, and wherein the virtual flow switch device includes:

a virtual port management function of generating a virtual port corresponding to respective logical channels in response to an event of generating a logical channel notified by the logical channel management device, and performing virtual port management; and a port event notification function of giving notification of an event of generation of the virtual port to the control device.

* * * * *